(12) United States Patent
Futaki et al.

(10) Patent No.: US 11,576,080 B2
(45) Date of Patent: *Feb. 7, 2023

(54) RADIO ACCESS NETWORK NODE, CORE NETWORK NODE, RADIO TERMINAL, AND METHODS THEREFOR

(71) Applicant: NEC CORPORATION, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,962

(22) Filed: Jun. 22, 2021

(65) Prior Publication Data

US 2021/0314817 A1  Oct. 7, 2021

Related U.S. Application Data

(63) Continuation of application No. 16/636,513, filed as application No. PCT/JP2018/015156 on Apr. 11, 2018, now Pat. No. 11,076,317.

(30) Foreign Application Priority Data

Aug. 9, 2017 (JP) ................. 2017-154365

(51) Int. Cl.
*H04W 28/08* (2009.01)
*H04W 76/15* (2018.01)
*H04W 76/22* (2018.01)

(52) U.S. Cl.
CPC ... *H04W 28/0815* (2020.05); *H04W 28/0835* (2020.05); *H04W 28/0967* (2020.05); *H04W 76/15* (2018.02); *H04W 76/22* (2018.02)

(58) Field of Classification Search
CPC ......... H04W 28/0815; H04W 28/0835; H04W 28/0967; H04W 76/15; H04W 76/22; H04W 36/0069; H04W 72/0426
See application file for complete search history.

(56) References Cited

U.S. PATENT DOCUMENTS 10,362,511 B2  7/2019  Youn et al.
10,419,985 B2  9/2019  Kim et al.
(Continued)

FOREIGN PATENT DOCUMENTS

WO    2018/066702 A1    4/2018

OTHER PUBLICATIONS

3GPP TS 38.300 V0.4.1, "3rd Generation Partnership Project; Technical Specification Group Radio Access Network; NR; NR and NG-RAN Overall Description; Stage 2 (Release 15)", Jun. 2017, 55 pages.

(Continued)

*Primary Examiner* — Ahmed Elallam
(74) *Attorney, Agent, or Firm* — Sughrue Mion, PLLC

(57) ABSTRACT

A master RAN node (1) sends, to a control plane function (5) in a core network (4), a modification request for modification of a first PDU session already established between a radio terminal (3) and a user plane function (6) in the core network (4). The modification request implicitly or explicitly indicates that PDU session split is needed for the first PDU session. The modification request causes the control plane function (5) to control the user plane function (6) to move a specific one or more QoS flows of a plurality of QoS flows associated with the first PDU session from a first tunnel between the user plane function (6) and the master RAN node (1) to a second tunnel between the user plane function (6) and a secondary RAN node (2). This contrib- (Continued)

utes, for example, to implementing PDU session split in a radio communication network.

15 Claims, 24 Drawing Sheets

(56) References Cited

U.S. PATENT DOCUMENTS

| | | | |
|---|---|---|---|
| 10,470,199 B2 | 11/2019 | Wu | |
| 10,834,772 B2* | 11/2020 | Wang | H04W 76/11 |
| 10,979,933 B2* | 4/2021 | Huang | H04W 28/10 |
| 10,993,138 B2* | 4/2021 | Van Der Velde ... | H04W 28/085 |
| 11,116,025 B2* | 9/2021 | Mochizuki | H04L 5/001 |
| 11,240,700 B2* | 2/2022 | Han | H04W 28/0263 |
| 2018/0199398 A1 | 7/2018 | Dao et al. | |
| 2019/0313473 A1 | 10/2019 | Kim et al. | |
| 2019/0320476 A1* | 10/2019 | Wang | H04W 76/15 |
| 2019/0349803 A1 | 11/2019 | Byun et al. | |
| 2019/0357075 A1 | 11/2019 | Van Der Velde et al. | |
| 2020/0015116 A1 | 1/2020 | Huang et al. | |
| 2020/0084815 A1 | 3/2020 | Rinne et al. | |
| 2021/0235314 A1* | 7/2021 | Huang | H04W 36/08 |

OTHER PUBLICATIONS

3GPP TSG-RAN WG2 Meeting #97 bis, "NR + NR DC: QOS Architecture", Samsung, 3GPP Tdoc R2-1703252, Apr. 2017, 5 pages.
3GPP TSG-RAN WG3 Meeting #96, "PDU Session Split at UPF", 3GPP Tdoc R3-171711, May 2017, 2 pages.
3GPP TSG-RAN WG3 Meeting #96, "Response to R3-171711 (PDU Session split at UPF)", NTT Docomo, Inc., 3GPP Tdoc R3-171898, May 2017, 2 pages.
3GPP TSG RAN WG3 #96, Qualcomm Incorporated, "Flow QoS Support in Dual Connectivity", Qualcomm Incorporated, R3-171796, May 19, 2017, 3 pages.
3GPP TSG-RAN WG3 NR AdHoc #2, TS 37.340 v0.1.1, ZTE Corporation (Rapporteur), R3-172067, Jun. 29, 2017, 31 pages.
3GPP TSG-RAN WG3 NR AdHoc, "Discussion on the TNL Address", Samsung, R3-172273, Jun. 29, 2017, 4 pages.
3GPP TSG-RAN WG3 #NR2 Ad-Hoc, "Granularity of offload for Option 7", Huawei, R3-172477, Jun. 29, 2017, 4 pages.
3GPP TSG-RAN3#97, "PDU Session Split and its signalling impact", NEC, R3-173029, Aug. 25, 2017, 3 pages.
International Search Report for PCT/JP2018/015156, dated Jul. 3, 2018 [PCT/ISA/210].
"3rd Generation Partnership Project; Technical Specification Group Services and System Aspects; Procedures for the 5G System; Stage 2 (Release 15)", 3GPP TS 23.502 V0.5.0, Jul. 2017, total 148 pages.
NTT Docomo et al., "Procedures for Dual Connectivity", 3GPP, SA WG2 Meeting #122, S2-174985, Jun. 26-30, 2017, total 10 pages.
Communication dated Aug. 24, 2020 from European Patent Office in EP Application No. 18843513.5.
Japanese Office Communication for JP Application No. 2021-102130 dated Jul. 12, 2022 with English Translation,.
CATT, "Discussion on PDU session modification indication", 3GPP TSG RAN WG3 #96, R3-171539. May 15-19, 2017.

* cited by examiner

| DC TYPE | SRB TYPE | DRB TYPE |
|---|---|---|
| EN-DC | MCG SRB<br>MCG SPLIT SRB<br>SCG SRB | MCG BEARER<br>MCG SPLIT BEARER<br>SCG BEARER<br>SCG SPLIT BEARER |
| NE-DC | MCG SRB<br>MCG SPLIT SRB | MCG BEARER<br>MCG SPLIT BEARER<br>SCG BEARER |
| NG-EN-DC | MCG SRB<br>MCG SPLIT SRB<br>SCG SRB | MCG BEARER<br>MCG SPLIT BEARER<br>SCG BEARER<br>SCG SPLIT BEARER |
| NR-NR DC | MCG SRB<br>MCG SPLIT SRB<br>SCG SRB | MCG BEARER<br>MCG SPLIT BEARER<br>SCG BEARER<br>SCG SPLIT BEARER |

Fig. 6

PDU Session Request To Be Modified List

| IE/Groupe Name | Presence | Range | IE type and reference | Semantics description |
|---|---|---|---|---|
| PDU Session Request To Modify Item IEs | | 1..<maxnoof PDUSessions> | | |
| >PDU Session ID | M | | <ref> | |
| >DL TNL Information | O | | TNL Information <ref> | Transport Layer Adress and TEID at gNB |
| >CHOICE Modification Type | M | | | |
| >>Modify all | | | | |
| >>>All | M | 1 | ENUMERATED (all, ...) | |
| >>Modify Partially | | | | |
| >>>QoS Flow Request To Be Modified List | | 1..<maxnoof QoSFlows> | | |
| >>>>QoS Flow Request To Be Modified Item IEs | | | | |
| >>>>>QoS Flow Indicator | M | | <ref> | |

Fig. 13A

PDU Session Request To Be Modified List

| IE/Groupe Name | Presence | Range | IE type and reference | Semantics description |
|---|---|---|---|---|
| PDU Session Request To Modify Item IEs | | 1..<maxnoof PDUSessions> | | |
| >PDU Session ID | M | | <ref> | |
| >DL TNL Information | O | | TNL Information <ref> | Transport Layer Adress and TEID at gNB |
| >CHOICE Modification Type Option | M | | | |
| >>All | O | | | |
| >>Split (or Partial) | O | | | PDU Session Split |
| >>>QoS Flow Request To Be Modified List | | 1 | | |
| >>>>QoS Flow Request To Be Modified Item IEs | | 1..<maxnoof QoSFlows> | | |
| >>>>>QoS Flow Indicator | M | | <ref> | |

Fig. 13B

PDU Session Request To Be Modified List

| IE/Groupe Name | Presence | Range | IE type and reference | Semantics description |
|---|---|---|---|---|
| PDU Session Request To Modify Item IEs | | 1..\<maxnoof PDUSessions\> | | |
| >PDU Session ID | M | | \<ref\> | |
| >DL TNL Information | O | | TNL Information \<ref\> | Transport Layer Adress and TEID at gNB |
| >Modification Type Option | O | | ENUMERATED (Split, ...) | |
| >>QoS Flow Request To Be Modified List | | 1 | | |
| >>>QoS Flow Request To Be Modified Item IEs | | 1..\<maxnoof QoSFlows\> | | |
| >>>>QoS Flow Indicator | M | | \<ref\> | |

Fig. 14

PDU Session Request To Be Setup List

| IE/Groupe Name | Presence | Range | IE type and reference | Semantics description |
|---|---|---|---|---|
| PDU Session Request To Be Setup Item IEs | | 1..<maxnoof PDUSessions> | | |
| >PDU Session ID | M | | <ref> | PDU session to be split |
| >DL TNL Information | O | | TNL Information <ref> | Transport Layer Adress and TEID at gNB |
| >>QoS Flow Request To Be Modified List | | 1 | | |
| >>>QoS Flow Request To Be Modified Item IEs | | 1..<maxnoof QoSFlows> | | |
| >>>>QoS Flow Indicator | M | | <ref> | |

Fig. 16

RADIO ACCESS NETWORK NODE, CORE NETWORK NODE, RADIO TERMINAL, AND METHODS THEREFOR

CROSS REFERENCE TO RELATED APPLICATIONS

This application is Continuation of U.S. application Ser. No. 16/636,513, filed on Feb. 4, 2020, which is a National Stage of International Application No. PCT/JP2018/015156 filed Apr. 11, 2018, claiming priority based on Japanese Patent Application No. 2017-154365, filed Aug. 9, 2017, the disclosures of which are incorporated herein by reference.

TECHNICAL FIELD

The present disclosure relates to a radio communication system and, in particular, to a dual-connectivity operation in which a radio terminal simultaneously uses multiple cells served by different radio access network nodes.

BACKGROUND ART

The 3rd Generation Partnership Project (3GPP) has been conducting the standardization for the fifth generation mobile communication system (5G) to make it a commercial reality in 2020 or later. 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or an NG RAT. A new Radio Access Network (RAN) for the 5G System is referred to as a 5G-RAN or a NextGen RAN (NG RAN). A new base station in the 5G-RAN is referred to as an NR NodeB (NR NB) or a gNodeB (gNB). A new core network for the 5G System is referred to as a 5G Core Network (5G-CN or 5GC) or a NextGen Core (NG Core). A radio terminal (i.e., User Equipment (UE)) capable of being connected to the 5G System is referred to as 5G UE or NextGen UE (NG UE), or simply referred to as UE. The official names of the RAT, UE, radio access network, core network, network entities (nodes), protocol layers and the like for the 5G System will be determined in the future as standardization work progresses.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN (E-UTRAN)) and a core network (i.e., EPC). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS. An SDF is one or more packet flows that match an SDF template (i.e., packet filters) based on a Policy and Charging Control (PCC) rule. In order to achieve packet routing, each packet to be transferred through an EPS bearer contains information for identifying which bearer (i.e., General Packet Radio Service (GPRS) Tunneling Protocol (GTP) tunnel) the packet is associated with. In addition, a QoS class identifier (QCI) is used as information indicating a QoS class. The 3GPP specifications specify an association between each QCI and the corresponding QoS characteristics (e.g., a requirement on packets and transmission delay (i.e., Packet Delay Budget)).

In contrast, with regard to the 5G System, it is discussed that although radio bearers may be used in the NG-RAN, no bearers are used in the 5GC or in the interface between the 5GC and the NG-RAN. Specifically, PDU flows are defined instead of an EPS bearer, and one or more SDFs are mapped to one or more PDU flows. A PDU flow between a 5G UE and a user-plane terminating entity in an NG Core (i.e., an entity corresponding to a P-GW in the EPC) corresponds to an EPS bearer in the EPS Bearer-based QoS concept. The PDU flow corresponds to the finest granularity of the packet forwarding and treatment in the 5G system. That is, the 5G System adopts the Flow-based QoS (or per-flow QoS) concept instead of the Bearer-based QoS concept. In the Flow-based QoS concept, QoS is handled per PDU flow. In the QoS framework of the 5G system, a PDU flow is identified by a PDU flow ID contained in a header encapsulating a Service Data Unit of a tunnel of a N3 interface. The N3 interface is a user plane interface between the 5GC and the gNB (i.e., NG-RAN). Association between a 5G UE and a data network is referred to as a "PDU session". The term "PDU session" corresponds to the term "PDN connection" in LTE and LTE-Advanced. A plurality of PDU flows can be configured in one PDU session. The 3GPP specifications specify, for the 5G system, a 5G QoS Indicator (5QI) corresponding to the LTE QCI.

The PDU flow is also referred to as a "QoS flow". The QoS flow is the finest granularity in QoS treatment in the 5G system. User plane traffic having the same N3 marking value in a PDU session corresponds to a QoS flow. The N3 marking corresponds to the above-described PDU flow ID, and it is also referred to as a QoS flow Identity (QFI) or a Flow Identification Indicator (FII). There is one-to-one association (i.e., one-to-one mapping) between each 5QI and the corresponding QFI that have the same value (or number).

FIG. 1 shows a basic architecture of the 5G system. A UE establishes one or more Signalling Radio Bearers (SRBs) and one or more Data Radio Bearers (DRBs) with a gNB. The 5GC and the gNB establish a control plane interface and a user plane interface for the UE. The control plane interface between the 5GC and the gNB (i.e., RAN) is referred to as an N2 interface, an NG2 interface or an NG-c interface and is used for transfer of Non-Access Stratum (NAS) information and for transfer of control information (e.g., N2 AP Information Element) between the 5GC and the gNB. The user plane interface between the 5GC and the gNB (i.e., RAN) is referred to as an N3 interface, an NG3 interface or an NG-u interface and is used for transfer of packets of one or more PDU flows in a PDU session of the UE.

Note that, the architecture shown in FIG. 1 is merely one of the 5G architecture options (or deployment scenarios). The architecture shown in FIG. 1 is referred to as "Standalone NR (in NextGen System)" or "Option 2". The 3GPP further discusses network architectures for multi-connectivity operations using the E-UTRA and NR radio access technologies. A representative example of the multi-connectivity operations is Dual Connectivity (DC) in which one Master node (MN) and one Secondary node (SN) cooperate with each other and simultaneously communicate with one UE. The Dual Connectivity operation using the E-UTRA and NR radio access technologies is referred to as Multi-RAT Dual Connectivity (MR-DC). The MR-DC is dual connectivity between E-UTRA and NR nodes.

In the MR-DC, one of the E-UTRA node (i.e., eNB) and the NR node (i.e., gNB) operates as a Master node (MN), while the other one operates as a Secondary node (SN), and at least the MN is connected to the core network. The MN provides one or more Master Cell Group (MCG) cells to the UE, while the SN provides one or more Secondary Cell Group (SCG) cells to the UE. The MR-DC includes "MR-DC with the EPC" and "MR-DC with the 5GC".

The MR-DC with the EPC includes E-UTRA-NR Dual Connectivity (EN-DC). In the EN-DC, the UE is connected to an eNB operating as the MN and a gNB operating as the SN. Further, the eNB (i.e., Master eNB) is connected to the EPC, while the gNB (i.e., Secondary gNB) is connected to the Master eNB through the X2 interface.

The MR-DC with the 5GC includes NR-E-UTRA Dual Connectivity (NE-DC) and NG-RAN E-UTRA-NR Dual Connectivity (NG-EN-DC). In the NE-DC, the UE is connected to a gNB operating as the MN and an eNB operating as the SN, the gNB (i.e., Master gNB) is connected to the 5GC, and the eNB (i.e., Secondary eNB) is connected to the Master gNB through the Xn interface. On the other hand, in the NG-EN-DC, the UE is connected to an eNB operating as the MN and a gNB operating as the SN, and the eNB (i.e., Master eNB) is connected to the 5GC, and the gNB (i.e., Secondary gNB) is connected to the Master eNB through the Xn interface.

FIGS. 2, 3 and 4 show the network configurations of the above-described three DC types: EN-DC, NE-DC and NG-EN-DC, respectively. The 5G System further supports dual connectivity between two gNBs. In this specification, dual connectivity between two gNBs is referred to as NR-NR DC. FIG. 5 shows the network configuration of NR-NR DC.

FIG. 6 shows SRBs and DRBs supported by the above-described three MR-DC types and by the NR-NR DC. Note that, FIG. 6 shows bearer types to be supported in 3GPP Release 15 that is currently under discussion in the 3GPP. Accordingly, the bearer types supported by these DC types may be different from those shown in FIG. 6.

The MCG SRB is an SRB established between the UE and the MN in an MCG cell, and Radio Resource Control Protocol Data Units (RRC PDUs) generated by the MN can be transported via the MCG SRB. Meanwhile, RRC PDUs generated by the SN can be transported to the UE via the MN and the MCG SRB. Alternatively, the SN can establish an SRB (SCG SRB) between the SN and the UE in an SCG cell in order to transport RRC PDUs generated by the SN directly between the SN and the UE. The SCG SRB is referred to as, for example, an SRB3. The MCG split SRB performs duplication of RRC PDUs that can be transported on the MCG SRB, thereby enabling the same RRC PDUs to be transported in both the MCG cell and the SCG cell.

The MCG bearer is a user plane bearer whose radio protocols are only located in the MCG. The MCG split bearer is a user plane bearer whose radio protocols are split at the MN and belong to both the MCG and the SCG. The SCG bearer is a user plane bearer whose radio protocols are only located in the SCG. The SCG split bearer is a user plane bearer whose radio protocols are split at the SN and belong to both the SCG and the MCG. The MCG split bearer and the SCG split bearer each perform duplication of PDCP data PDUs, thereby enabling the same PDCP data PDUs to be transported in both the MCG cell and the SCG cell.

Note that, the layer 2 functionality of NR (i.e., gNB and UE) is not the same as the layer 2 functionality of LTE (i.e., eNB and UE). For example, the NR layer 2 includes four sublayers, i.e., a Service Data Adaptation Protocol (SDAP) sublayer, a Packet Data Convergence Protocol (PDCP) sublayer, a Radio Link Control (RLC) sublayer, and a Medium Access Control (MAC) sublayer. In the NR PDCP sublayer, the size of the PDCP Sequence Number (SN) for DRBs is 12 bits or 18 bits, which is a subset of the possible values for the size of LTE PDCP SN (i.e., 7 bits, 12 bits, 15 bits, or 18 bits). However, when the LTE eNB is connected to the 5GC, the layer 2 of LTE (i.e., eNB and UE) includes an SDAP sublayer. On the other hand, when the NR gNB serves as the SN in the EN-DC, the layer 2 of NR (i.e., gNB and UE) does not need to include an SDAP sublayer. Alternatively, when the NR gNB serves as the SN in the EN-DC, the layer 2 of NR (i.e., gNB and UE) is implemented in such a manner that an SDAP sublayer is transparent to PDUs that pass through it. In other words, the SDAP sublayer may have a Transparent Mode.

The main services and functions of the SDAP sublayer include: mapping between a QoS flow and a data radio bearer (DRB); and marking QoS flow Identity (QFI) in both downlink (DL) and uplink (UL) packets. A single protocol entity of SDAP is configured for each individual PDU session, except for DC. In DC, two entities can be configured (i.e., one for MCG and another one for SCG).

FIG. 7 shows a non-DC QoS architecture of the 5GC (see Non-Patent Literature 1). The 5GC establishes one or more PDU sessions for a UE. The NG-RAN establishes one or more DRBs per PDU session for a UE. The NG-RAN maps packets belonging to different PDU sessions to different DRBs. In other words, the NG-RAN does not map QoS flows belonging to different PDU sessions (i.e., packets to be transmitted by these QoS flows) to the same DRB. Accordingly, in the PDU Session establishment, the NG-RAN establishes at least one default DRB for each PDU session indicated by the 5GC. In the non-DC, the packets of QoS flows belonging to a single PDU session are delivered through an NG-U tunnel configured between an NG-RAN node (i.e., a gNB) and a User Plane Function (UPF) in the 5GC. The NG-U tunnel is, for example, a General Packet Radio Service (GPRS) Tunnelling Protocol (GTP) tunnel. The terminal node of the NG-U tunnel in the 5GC is also referred to as a user plane gateway (UPGW). In the QoS concept of the 5GC, the 5GC allows QoS flows that belong to the same PDU session but have different QoS levels to be transferred through a single NG-U tunnel. The NG-U tunnel is also referred to as an N3 tunnel, an NG3 tunnel, a PDU tunnel, or a PDU session tunnel.

Non-Patent Literatures 2, 3, and 4 propose options to split NG-U resources for a single PDU session in the UPF (UPGW) in the 5GC when the DC is executed in the NG-RAN. This DC includes the NR-NR DC and the MR-DC with the 5GC (e.g., the NE-DC and the NG-EN DC). Specifically, in the DC in the 5G system, two NG-U tunnels need to be simultaneously supported for a single PDU session. One of the NG-U tunnels is configured between the UPF (UPGW) and the Master Node (MN), while the other of the NG-U tunnels is configured between the UPF (UPGW) and the Secondary Node (SN). In this specification, such a configuration is referred to as PDU session split. In other words, the PDU session split can be defined as a configuration in which two or more NG-U tunnels are simultaneously supported for a single PDU session. In still other words, the PDU session split can be defined as a configuration that allows part of the single PDU session to be sent to the MN, and the rest to be sent to the SN(s).

In the PDU session split having been discussed in the 3GPP, the MN moves some QoS flows in a single PDU session, which have been transferred via the MN, to the SN. FIG. 8 shows the movement of QoS flows from the MN to the SN as disclosed in Non-Patent Literatures 3 and 4. In the example shown in FIG. 8, a QoS flow 802, which is one of the two QoS flows 801 and 802 in a single PDU session that have been transferred via the MN, is to be moved to the SN. The QoS flow 802 moved from the MN to the SN is transferred through an NG-U tunnel 822 configured between the UPF (UPGW) and the SN. In other words, in the DC in the 5G system, different QoS flows 801 and 802 in the same PDU session need to be simultaneously sent to the MN and the SN, respectively, through two different NG-U tunnels 821 and 822. Note that, the QoS flow 801 to be sent to the MN is sometimes referred to as an MCG flow, while the QoS flow 802 to be sent to the SN is sometimes referred to as an SCG flow.

CITATION LIST

Non Patent Literature

[Non-Patent Literature 1] 3GPP TS 38.300 V0.4.1 (2017-06), "3rd Generation Partnership Project; Technical Specification Group Radio Access Network; NR; NR and NG-RAN Overall Description; Stage 2 (Release 15)", June 2017

[Non-Patent Literature 2] 3GPP Tdoc R2-1703252, Samsung, "NR+NR DC: QOS Architecture", 3GPP TSG-RAN WG2 Meeting #97 bis, April 2017

[Non-Patent Literature 3] 3GPP Tdoc R3-171711, Ericsson, "PDU Session Split at UPF", 3GPP TSG-RAN WG3 Meeting #96, May 2017

[Non-Patent Literature 4] 3GPP Tdoc R3-171898, NTT DOCOMO, INC., "Response to R3-171711 (PDU Session split at UPF)", 3GPP TSG-RAN WG3 Meeting #96, May 2017

SUMMARY OF INVENTION

Technical Problem

Non-Patent Literatures 2, 3 and 4 disclose that signaling or coordination between the MN (e.g., MgNB) and the core network (e.g., 5GC) is needed to achieve the PDU session split. Non-Patent Literatures 2, 3 and 4 also disclose that signaling or coordination between the MN (e.g., MgNB) and the SN (e.g., SgNB) is needed to achieve the PDU session split. However, neither Literature 2, 3 nor 4 discloses details of signaling for the PDU session split. It is thus unclear how to perform the PDU session split.

One of the objects to be attained by embodiments disclosed herein is to provide an apparatus, a method, and a program that contribute to implementing PDU session split in a radio communication network. It should be noted that this object is merely one of the objects to be attained by the embodiments disclosed herein. Other objects or problems and novel features will be made apparent from the following description and the accompanying drawings.

Solution to Problem

In a first aspect, a master Radio Access Network (RAN) node includes a memory and at least one processor coupled to the memory. The at least one processor is configured to send, to a control plane function in a core network, a modification request for modification of a first PDU session already established between a radio terminal and a user plane function in the core network. The modification request implicitly or explicitly indicates that PDU session split is needed for the already established first PDU session. The modification request causes the control plane function to control the user plane function to move a specific one or more Quality of Service (QoS) flows of a plurality of QoS flows associated with the already established first PDU session from a first tunnel between the user plane function and the master RAN node to a second tunnel between the user plane function and a secondary RAN node.

In a second aspect, a control plane node to be located in a core network includes a memory and at least one processor coupled to the memory. The at least one processor is configured to receive, from a master Radio Access Network (RAN) node, a modification request for modification of a first PDU session already established between a radio terminal and a user plane function in the core network. The modification request implicitly or explicitly indicates that PDU session split is needed for the already established first PDU session. The at least one processor is further configured to, in response to receiving the modification request, control the user plane function to move a specific one or more Quality of Service (QoS) flows of a plurality of QoS flows associated with the already established first PDU session from a first tunnel between the user plane function and the master RAN node to a second tunnel between the user plane function and a secondary RAN node.

In a third aspect, a secondary Radio Access Network (RAN) node includes a memory and at least one processor coupled to the memory. The at least one processor is configured to receive an inter-node message from a master RAN node, the inter-node message requesting allocation of resources for dual connectivity for a radio terminal. The inter-node message also implicitly or explicitly indicates that PDU session split is to be applied to a first PDU session already established between the radio terminal and a user plane function in a core network. The PDU session split includes a configuration in which one or more first Quality of Service (QoS) flows of a plurality of QoS flows associated with the first PDU session are transferred through a first tunnel between the user plane function and the master RAN node, and in which one or more second QoS flows of the plurality of QoS flows are transferred through a second tunnel between the user plane function and the secondary RAN node.

In a fourth aspect, a radio terminal includes a memory and at least one processor coupled to the memory. The at least one processor is configured to receive an RRC connection reconfiguration message from a master RAN node or a secondary RAN node, the RRC connection reconfiguration message indicating a secondary cell group configuration for dual connectivity. The RRC connection reconfiguration message also implicitly or explicitly indicates that PDU session split is to be applied to a first PDU session already established between the radio terminal and a user plane function in a core network. The PDU session split includes a configuration in which one or more first Quality of Service (QoS) flows of a plurality of QoS flows associated with the first PDU session are transferred through a first tunnel between the user plane function and the master RAN node, and in which one or more second QoS flows of the plurality of QoS flows are transferred through a second tunnel between the user plane function and the secondary RAN node.

In a fifth aspect, a method performed by a master Radio Access Network (RAN) node includes sending, to a control plane function in the core network, a modification request for modification of a first PDU session already established between a radio terminal and a user plane function in a core network. The modification request implicitly or explicitly indicates that PDU session split is needed for the already established first PDU session.

In a sixth aspect, a method performed by a control plane node to be located in a core network includes receiving, from a master Radio Access Network (RAN) node, a modification request for modification of a first PDU session already established between a radio terminal and a user plane function in the core network. The modification request implicitly or explicitly indicates that PDU session split is needed for the already established first PDU session. The method further includes controlling the user plane function to move a specific one or more Quality of Service (QoS) flows of a plurality of QoS flows associated with the already established first PDU session from a first tunnel between the user plane function and the master RAN node to a second tunnel between the user plane function and a secondary RAN node.

In a seventh aspect, a method performed by a secondary Radio Access Network (RAN) node includes receiving an inter-node message from a master RAN node, the inter-node message requesting allocation of resources for dual connectivity for a radio terminal. The inter-node message also implicitly or explicitly indicates that PDU session split is to be applied to a first PDU session already established between the radio terminal and a user plane function in a core network.

In an eighth aspect, a method performed by a radio terminal includes receiving an RRC connection reconfiguration message from a master RAN node or a secondary RAN node, the RRC connection reconfiguration message indicating a secondary cell group configuration for dual connectivity. The RRC connection reconfiguration message also implicitly or explicitly indicates that PDU session split is to be applied to a first PDU session already established between the radio terminal and a user plane function in a core network.

In a ninth aspect, a program includes instructions (software codes) that, when loaded into a computer, cause the computer to perform the method according to the above-described fifth, sixth, seventh, or eighth aspect.

Advantageous Effects of Invention

According to the above-deceived aspects, it is possible to provide an apparatus, a method, and a program that contribute to implementing PDU session split in a radio communication network.

BRIEF DESCRIPTION OF DRAWINGS

FIG. 6 is a table showing bearer types supported by three DC types currently under discussion in the 3GPP;

FIG. 13A is a diagram showing an example of a format of a "PDU Session Request To Be Modified List" Information Element (IE);

FIG. 13B is a diagram showing an example of a format of a "PDU Session Request To Be Modified List" IE;

FIG. 14 is a diagram showing an example of a format of a "PDU Session Request To Be Modified List" IE;

FIG. 16 is a diagram showing an example of a format of a "PDU Session Request To Be Setup List" IE;

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on the NR-NR DC and the MR-DC with the 5GC. However, these embodiments may be applied to other radio communication systems supporting DC architecture using other RATs.

First Embodiment

Figure 1:
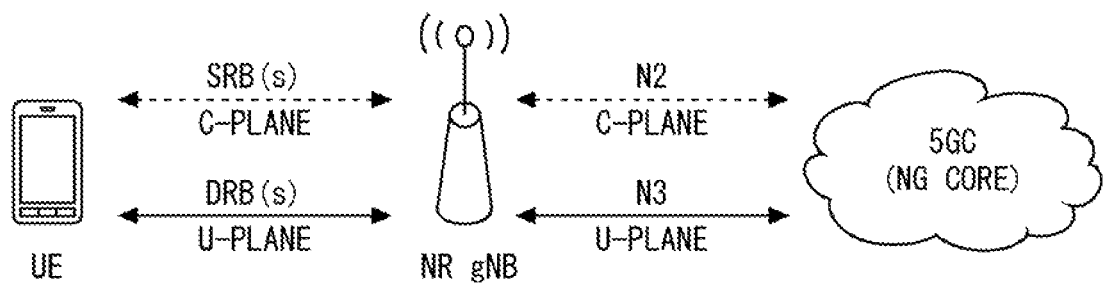
FIG. 1 is a diagram showing a basic architecture of a 5G System.
Figure 2:
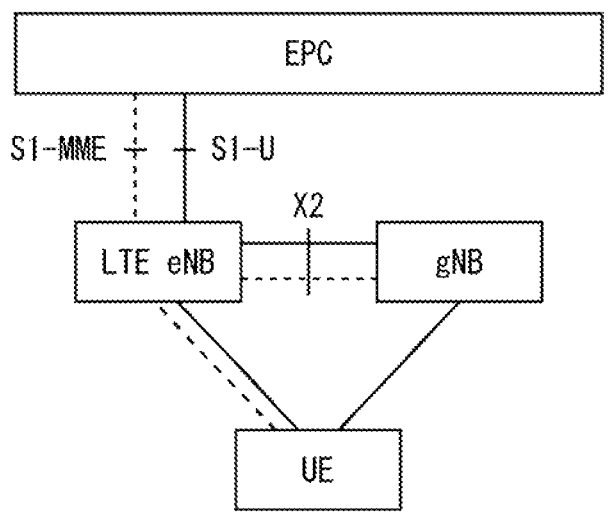
FIG. 2 is a diagram showing a network configuration of EN-DC.
Figure 3:
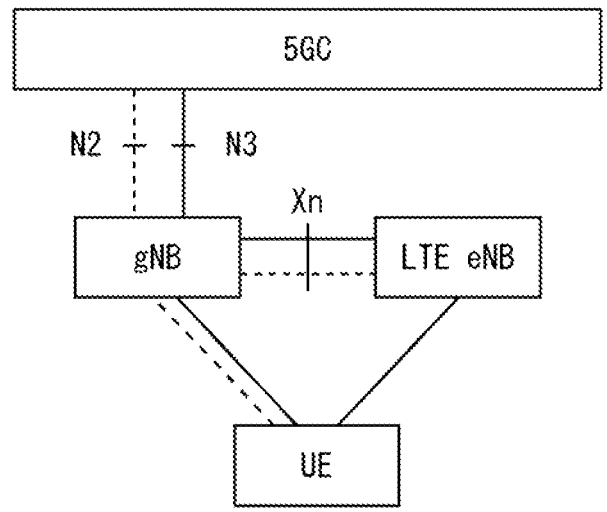
FIG. 3 is a diagram showing a network configuration of NE-DC.
Figure 4:
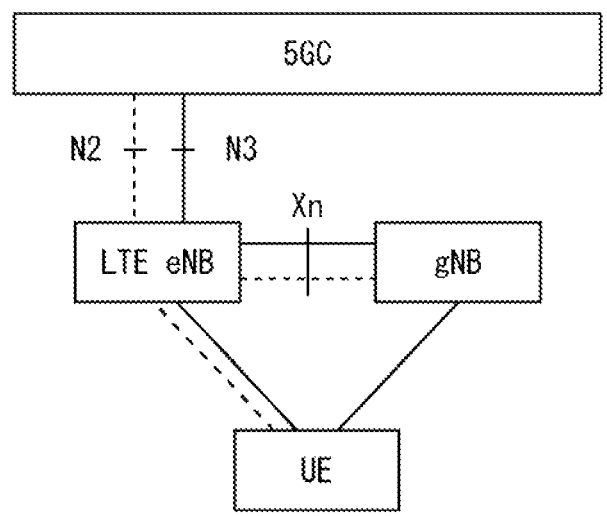
FIG. 4 is a diagram showing a network configuration of NG-EN-DC.
Figure 5:
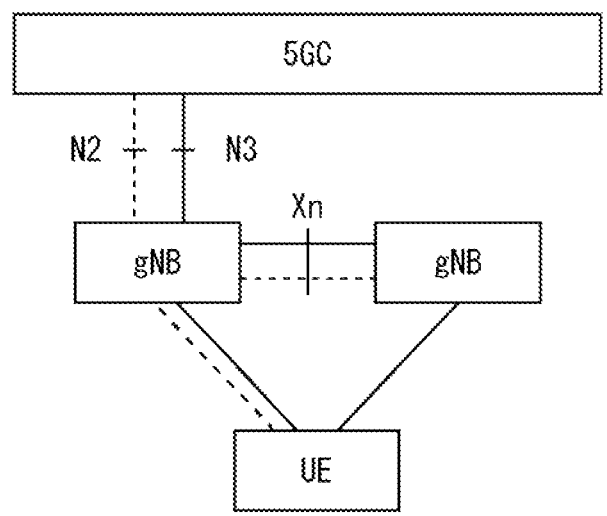
FIG. 5 is a diagram showing a network configuration of NR-NR DC.
Figure 7:
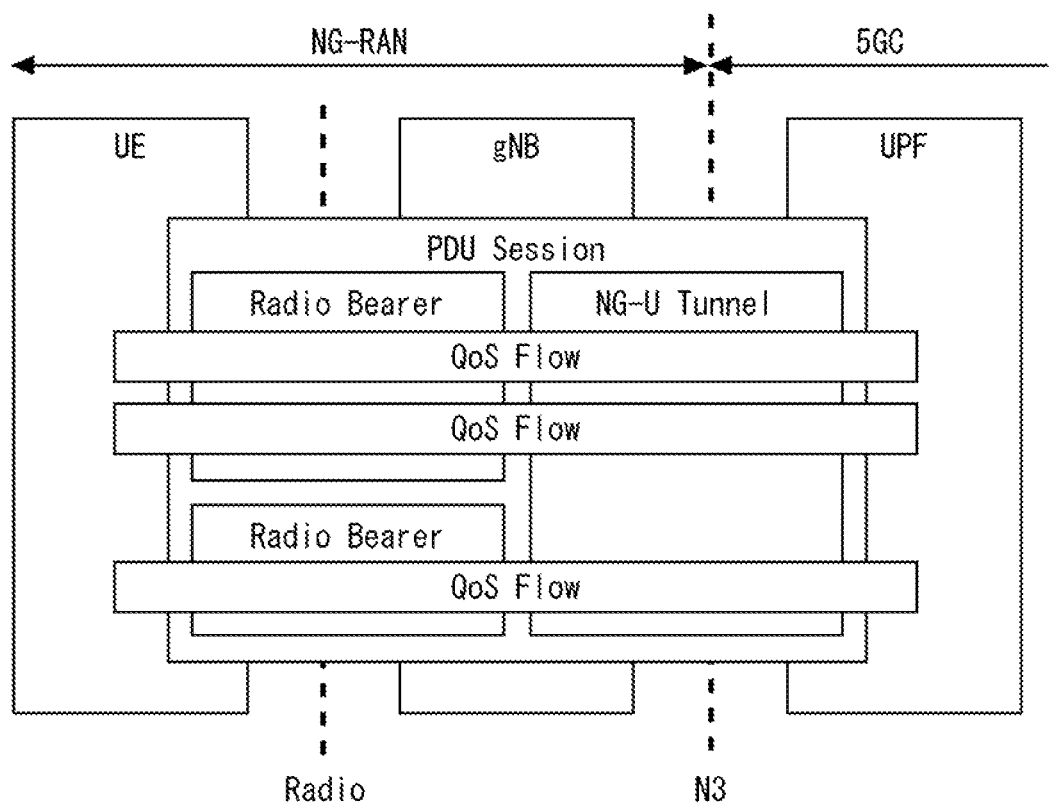
FIG. 7 is a diagram showing non-DC QoS architecture in the 5G system.
Figure 8:
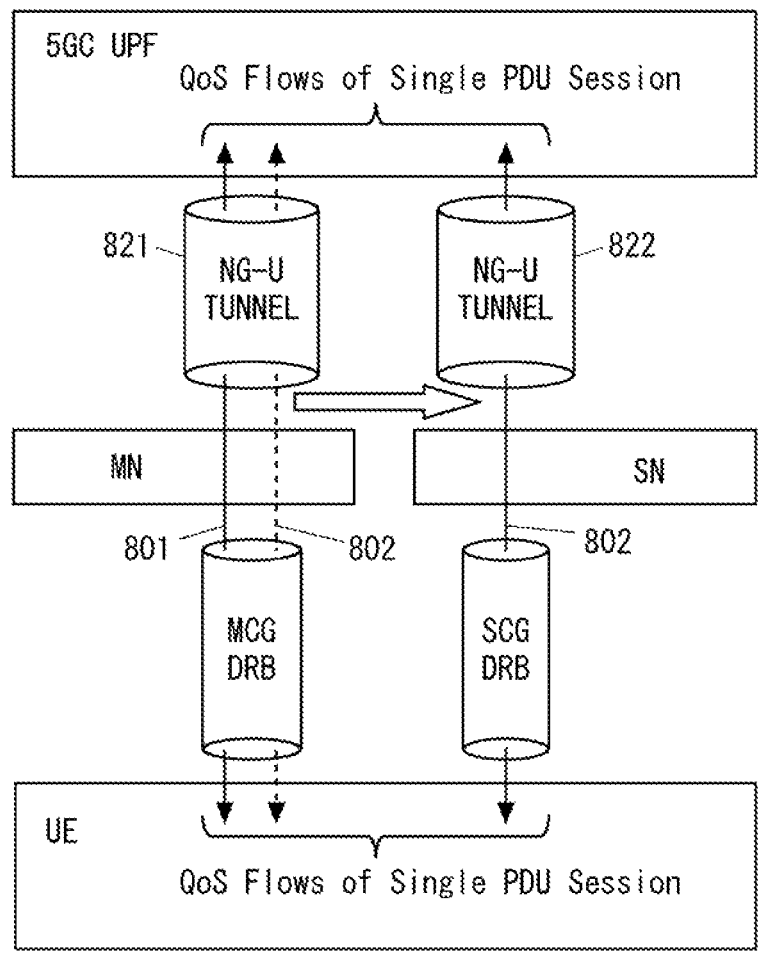
FIG. 8 is a diagram showing NR-NR DC QoS architecture in the 5G system.
Figure 9:
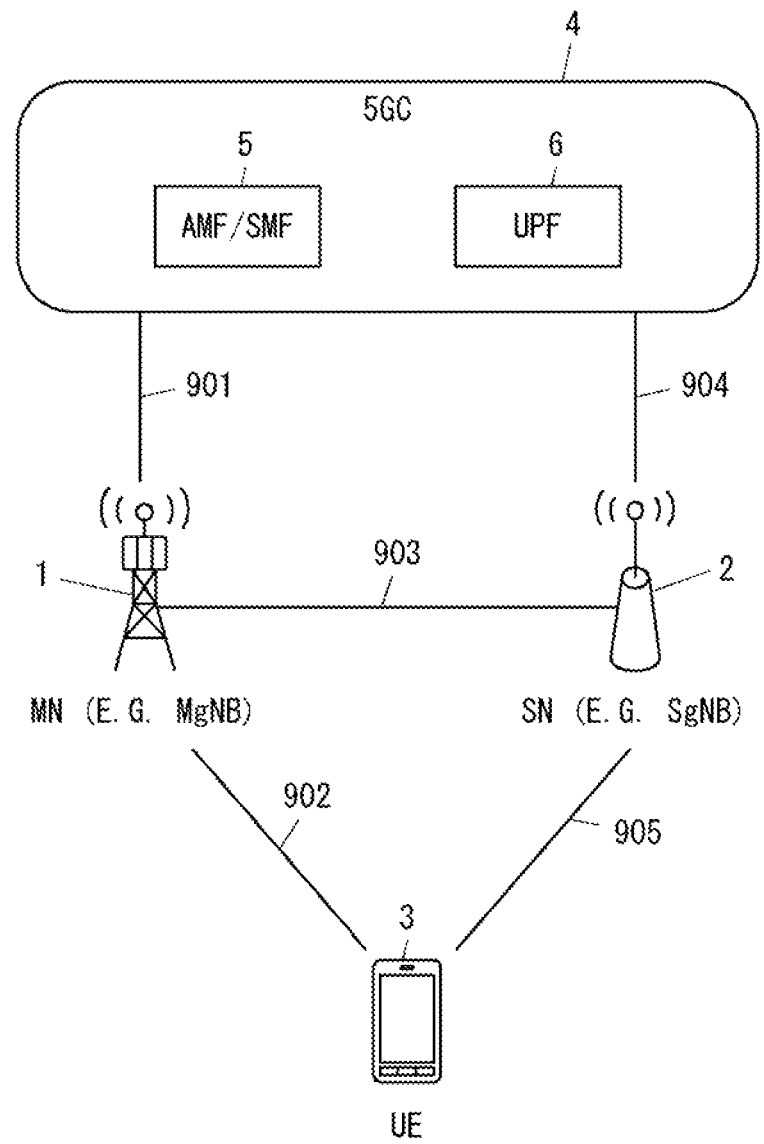
FIG. 9 is a diagram showing a configuration example of a radio communication network according to embodiments.

FIG. 9 shows a configuration example of a radio communication network according to a plurality of embodiments including this embodiment. In the example shown in FIG. 9, the radio communication network includes a master node (MN) 1, a secondary node (SN) 2, a UE 3, and a core network 4. The radio communication network shown in FIG. 9 supports the NR-NR DC or the MR-DC with the 5GC. More specifically, each of the MN 1 and the SN 2 is an NR node (i.e., gNB) or an E-UTRA node (i.e., eNB). The MN 1 and the SN 2 are connected to the core network 4 via interfaces 901 and 904. The SN 2 may also be connected to the core network 4 via an interface 604. The core network 4 is a 5GC. The interfaces 901 and 904 are NG interfaces (i.e., NG-c and NG-u, NG2 and NG3, or N2 and N3). The MN 1 and the SN 2 are connected to each other via an interface 903. The interface 903 is an Xn interface.

The core network 4 includes control plane functions (CPF) and user plane functions (UPF). The CPF include, for example, an Access and a Mobility Management Function (AMF), a Session Management Function (SMF), and a Policy Control function (PCF). The control plane functions are provided by one or more control plane entities (or one or more control plane nodes). The user plane functions are provided by one or more user plane entities (or one or more user plane nodes). The example of FIG. 9 shows one AMF/SMF entity 5 and one UPF entity 6. The AMF/SMF entity 5 provides the AMF or the SMF or both. The AMF/SMF entity 5 may include, for example, one or more entities, one or more physical nodes, or one or more computers. Similarly, the UPF entity 6 may include, for example, one or more entities, one or more physical nodes, or one or more computers. For example, there is a UPF entity 6 for each PDU session, or a plurality of UPF entities 6 are used for one PDU session.

The UE 3 supports one or both of the NR-NR DC and the MR-DC with the 5GC. Specifically, the UE 3 supports a dual-connectivity operation that uses the NR radio access technology or uses the E-UTRA and NR radio access technologies. The UE 3 has a capability to communicate simultaneously with the MN 1 and the SN 2. In other words, the UE 3 has a capability to aggregate a cell(s) belonging to the Master Cell Group (MCG) provided by the MN 1 with a cell(s) belonging to the Secondary Cell Group (SCG) provided by the SN 2. The MCG includes one or more cells provided from the master RAT. The SCG includes one or more cells provided from the secondary RAT. An air interface 902 between the MN 1 and the UE 3 provides a control plane connection (e.g., RRC connection, signaling radio bearers (SRBs)) and a user plane connection (e.g., data radio bearers (DRBs)). On the other hand, an air interface 905 between the SN 2 and the UE 3 includes at least a user plane connection. The air interface 905 may, or may not, include a control plane connection.

The MN 1, SN 2, UE 3, and the core network 4 are configured to support PDU session split. In the following, operations for the PDU session split performed by these nodes or entities will be described.

Figure 10:
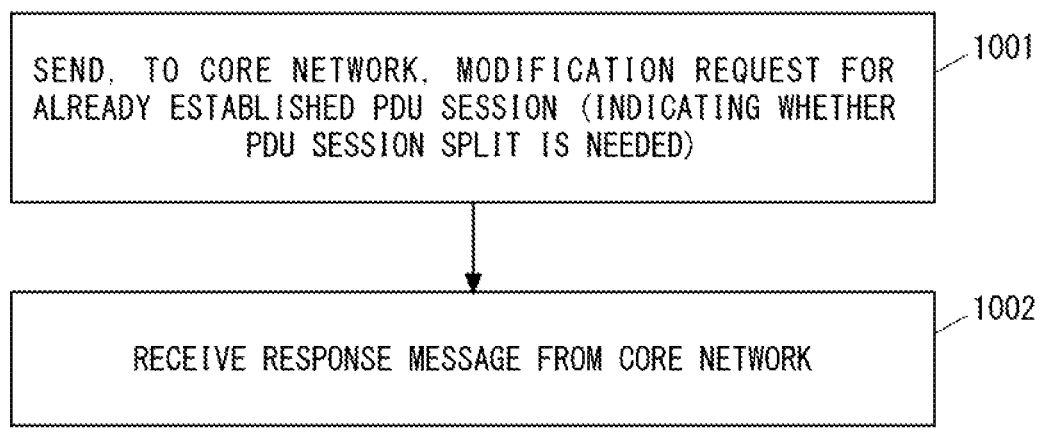
FIG. 10 is a flowchart showing an example of an operation of a master node according to a first embodiment.

FIG. 10 is a flowchart showing an example of the operation of the MN 1. In Step 1001, the MN 1 sends to the core network 4 a modification request for modification of an already established PDU session. The modification request implicitly or explicitly indicates that the PDU session split is needed for the PDU session that has already been established for the UE 3. In Step 1002, the MN1 receives from the core network 4 a response message replying to the modification request.

Figure 11:
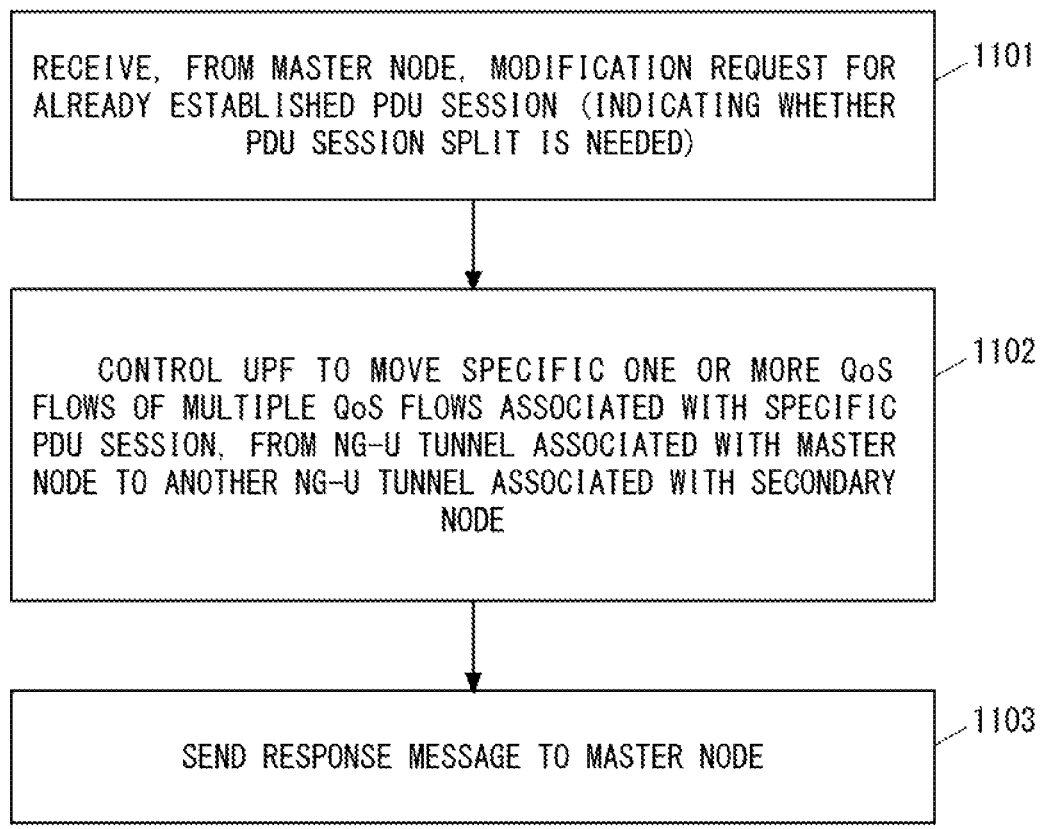
FIG. 11 is a flowchart showing an example of an operation of a control plane function entity according to the first embodiment.

FIG. 11 is a flowchart showing an example of the operation of the core network 4. The procedure shown in FIG. 11 is performed by the AMF/SMF entity 5. In Step 1101, the AMF/SMF entity 5 receives from the MN 1 the modification request for the already established PDU session, which implicitly or explicitly indicates whether or not the PDU session split is needed.

The AMF/SMF entity 5 analyzes the received modification request and determines whether or not the PDU session split needs to be performed (or whether or not it is requested to perform the PDU session split). More specifically, when the modification request indicates that the PDU session split is needed, the AMF/SMF entity 5 recognizes that the PDU session already established for the UE 3 needs to be split over two or more RAN nodes (e.g., the MN 1 and the SN 2).

When the PDU session split is needed, the AMF/SMF entity 5 controls the UPF entity 6 to move a specific one or more QoS flows of the plurality of QoS flows associated with the already established PDU session from an NG-U tunnel toward the MN 1 to an NG-U tunnel toward the SN 2 (Step 1102). In some implementations, the AMF/SMF entity 5 uses the same PDU session ID commonly for these two tunnels (i.e., reuse the same PDU session ID) to configure the NG-U tunnels toward the MN 1 and toward the SN 2. When the AMF/SMF entity 5 cannot apply the split to a PDU session for which the PDU session split has been needed (or for which the AMF/SMF entity 5 is requested to perform the PDU session split), the AMF/SMF entity 5 may reply to the MN 1 with a response message indicating that.

In some implementations, a PDU SESSION RESOURCE MODIFY INDICATION message may be used to send the modification request indicated in Step 1001 (and Step 1101).

This PDU SESSION RESOURCE MODIFY INDICATION message is used by the MN 1 to request modification of a PDU session(s) already established for a given UE. The PDU SESSION RESOURCE MODIFY INDICATION message is one of the NG Application Protocol (NGAP) (or N2 Application Protocol (N2AP)) messages to be sent via the NG-c (or N2) interface.

Figure 12:
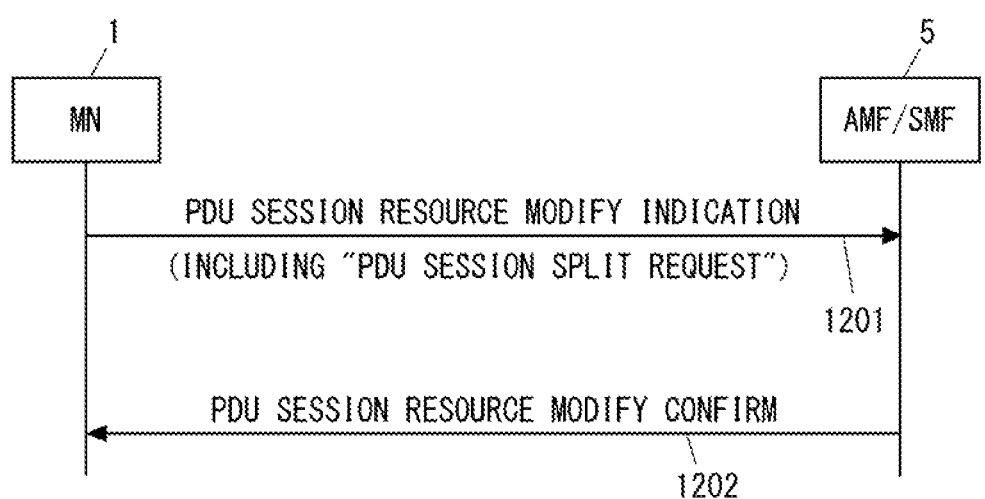
FIG. 12 is a sequence diagram showing an example of signalling regarding PDU session split according to the first embodiment.

FIG. 12 shows an example in which a PDU SESSION RESOURCE MODIFY INDICATION message is used. In Step 1201, the MN 1 sends a PDU SESSION RESOURCE MODIFY INDICATION message including a PDU session split request to the AMF/SMF entity 5. In Step 1202, the AMF/SMF entity 5 sends a PDU SESSION RESOURCE MODIFY CONFIRM message to the MN 1. This PDU SESSION RESOURCE MODIFY CONFIRM message corresponds to the response message indicated in Step 1002 (and Step 1103).

As an example, the modification request contained in the PDU SESSION RESOURCE MODIFY INDICATION message may be PDU-session type information explicitly indicating the need for the PDU session split. When the PDU session type information indicates that the PDU session split is needed (or requested), the AMF/SMF entity 5 may recognize that the PDU session needs to be split over two or more RAN nodes (e.g., the MN 1 and the SN 2). In contrast, the AMF/SMF entity 5 may recognize that the PDU session needs to be moved to another node (e.g., the SN 2) when the PDU session type information does not indicate that the PDU session split is needed (or requested).

The PDU SESSION RESOURCE MODIFY INDICATION message includes a "PDU Session Request To Be Modified List" information element (IE). FIG. 13A shows an example of a format of the "PDU Session Request To Be Modified List" IE. As shown in FIG. 13A, the "PDU Session Request To Be Modified List" IE includes a "PDU Session Request To Modify Item IEs" IE. The "PDU Session Request To Modify Item IEs" IE includes a "PDU Session ID" IE and a "DL TNL Information" IE. The "PDU Session ID" IE indicates a PDU Session ID of a PDU session for which the modification is needed (or the modification is requested). The "DL TNL Information" IE indicates a Downlink (DL) Transport Network Layer (TNL) address and a Tunnel Endpoint Identifier (TEID) for the PDU session specified by the "PDU Session ID" IE. These DL TNL address and TEID specify an endpoint on the RAN node (e.g., the gNB) side of the NG-U tunnel.

Further, in the example shown in FIG. 13A, the "PDU Session Request To Be Modified List" IE has been improved to include a "Modification Type" IE as one of its mandatory IEs. The "Modification Type" IE indicates whether the modification is applied to the entirety or part of the PDU session specified by the "PDU Session ID" IE. For example, the "Modification Type" IE indicates "Modify All" or "Modify Partially". When the "Modification Type" IE is set to "Modify Partially", this indicates the modification of the part of the PDU session (i.e., the PDU session split is requested) and the "PDU Session Request To Be Modified List" IE further includes a "QoS Flow Request To Be Modified List" IE. The "QoS Flow Request To Be Modified List" IE includes identifiers (i.e., QoS Flow Indicators (QFIs)) of respective QoS flows to be moved from the MN 1 to the SN 2. The "QoS Flow Request To Be Modified List" IE may be referred to as a "QoS Flow To Be Modified List" IE or a "QoS Flow To Modify List" IE.

Instead of the example shown in FIG. 13A, as shown in FIG. 13B, the "PDU Session Request To Be Modified List" IE may be improved to include a "Modification Type Option" IE as one of the mandatory IEs. The "Modification Type Option" IE indicates whether the modification of the PDU session specified by the "PDU Session ID" IE is the PDU session split or not. For example, the "Type Option" IE indicates "All" or "Split (or Partial)". When the "Type Option" IE is set to "Split (or Partial)", the "PDU Session Request To Be Modified List" IE further includes a "QoS Flow Request To Be Modified List" IE. The "QoS Flow Request To Be Modified List" IE includes identifiers (i.e., QoS Flow Indicators (QFIs)) of respective QoS flows to be moved from the MN 1 to the SN 2.

For example, when the "Modification Type" IE (FIG. 13A) has been set to "Modify Partially", or when the "Modification Type Option" IE (FIG. 13B) has been set to "Split (or Partial)", the AMF/SMF entity 5 may recognize that the PDU session needs to be split over two or more RAN nodes (e.g., the MN 1 and the SN 2) (or that it is requested to split the PDU session). In contrast, when the "Modification Type" IE (FIG. 13A) has been set to "Modify All", or when the "Modification Type Option" IE (FIG. 13B) has been set to "All", the AMF/SMF entity 5 may recognize that the PDU session needs to be moved to another RAN node (e.g., the SN 2) (or that it is requested to move the PDU session to another RAN node) The AMF/SMF entity 5 may further be configured to determine whether the DL TNL address included in the "DL TNL Information" IE is a new DL address or an additional DL address for the PDU session, based on whether or not the PDU session type information (e.g., Modification Type IE, or Modification Type Option IE) indicates that the PDU session split is needed (or requested). Specifically, when the "Modification Type" IE (FIG. 13A) has been set to "Modify Partially", or when the "Modification Type Option" IE (FIG. 13B) has been set to "Split (or Partial)", the AMF/SMF entity 5 may determine that the DL TNL address included in the "DL TNL Information" IE is an additional DL address for the PDU session (i.e., an address of the SN 2 associated with an NG-U tunnel to be added). In contrast, when the "Modification Type" IE (FIG. 13A) has been set to "Modify All", or when the "Modification Type Option" IE (FIG. 13B) has been set to "All", the AMF/SMF entity 5 may determine that the DL TNL address included in the "DL TNL Information" IE is a new DL address for the PDU session.

Instead of the value "All" of the "Modification Type Option" IE (FIG. 13B), values "MN" and "SN" may be specified. Specifically, the "Modification Type Option" IE may be set to any of "MN", "SN", and "Split (or Partial)". For example, when the "Modification Type Option" IE has been set to "MN" (or "SN"), the AMF/SMF entity 5 may recognize that the PDU session needs to be moved to the MN 1 (or to the "SN 2"). Further, when the "Modification Type Option" IE has been set to "MN" or "SN", the AMF/SMF 5 may determine that the DL TNL address included in the "DL TNL Information" IE is a new DL address for the PDU session.

Alternatively, the AMF/SMF entity 5 may determine whether or not the PDU session split is needed depending on whether or not the "PDU Session Request To Be Modified List" IE includes the "QoS Flow Request To Be Modified List" IE. Specifically, when the "QoS Flow Request To Be Modified List" IE included in the "PDU Session Request To Be Modified List" IE shows only some of the QoS flows of the PDU session, the AMF/SMF entity 5 may recognize that the PDU session split is needed. In contrast, when the "QoS Flow Request To Be Modified List" IE shows only some of the QoS flows of the PDU session, and at the same time, when the DL TNL address included in the "DL TNL Information" IE matches a DL TNL address for all the rest of the QoS flows of the PDU session, the AMF/SMF entity 5 may recognize that the split PDU session needs to be merged (unified) into a single RAN node.

FIG. 14 shows still another example of the format of the "PDU Session Request To Be Modified List" IE. In the example shown in FIG. 14, the "PDU Session Request To Be Modified List" IE has been improved to include, as one of the optional IEs, a "Modification Type Option" IE, which is set to "Split" when needed. For example, when the "Modification Type Option" IE has been set to "Split", and at the same time, has been included in the "PDU Session Request To Be Modified List" IE, the AMF/SMF entity 5 may recognize that the PDU session needs to be split over two or more RAN nodes (e.g., the MN 1 and the SN 2) (or that it is requested to split the PDU session). In contrast, when the "Modification Type Option" IE has not been included in the "PDU Session Request To Be Modified List" IE, the AMF/SMF entity 5 may recognize that the PDU session needs to be moved to another RAN node (e.g., the SN 2) (or that it is requested to move the PDU session to another RAN node). The "Type Option" IE shown in FIG. 14 may correspond to the above-described PDU-session type information.

Alternatively, the "Modification Type Option" IE in FIG. 14 may be set to either one of "Split" and "Merge (or Unify)". For example, when the "Modification Type Option" IE has been set to "Split", the AMF/SMF entity 5 may recognize that the PDU session needs to be split over two or more RAN nodes (e.g., the MN 1 and the SN 2). In contrast, when the "Modification Type Option" IE has been set to "Merge (or Unify)", the AMF/SMF 5 may recognize that the PDU session having been split over two or more RAN nodes (e.g., the MN 1 and the SN 2) needs to be merged (unified) into a single RAN node.

The PDU SESSION RESOURCE MODIFY CONFIRM message includes, for example, a "PDU Session Confirm To Modify List" Information Element (IE). This IE indicates a PDU session(s) that the AMF/SMF entity 5 has admitted (or a PDU session(s) for which it has succeeded in the PDU session split) among the one or more PDU sessions for which the PDU session split has been requested by the MN 1. Further, the PDU SESSION RESOURCE MODIFY CONFIRM message may include a "PDU Session Not Admitted List" IE (or a "PDU Session Failed to Modify List" IE) indicating a PDU session(s) that the AMF/SMF entity 5 has not admitted (or a PDU session(s) for which it has failed in the PDU session split).

In other implementations, a new NGAP message may be defined to send the modification request indicated in Step 1001 in FIG. 10 (and Step 1101 in FIG. 11). The new NGAP message requests the core network 4 to split an already configured PDU session. In other words, the new NGAP message requests the core network 4 to set up the already configured PDU session further to anther RAN node (e.g., the SN 2). For example, the new NGAP message may be named a PDU SESSION RESOURCE SETUP INDICATION message or a PDU SESSION RESOURCE ADDITION INDICATION message. A response NGAP message from the core network 4 to the RAN node may be named a PDU SESSION RESOURCE SETUP CONFIRM message or a PDU SESSION RESOURCE ADDITION CONFIRM message.

Figure 15:
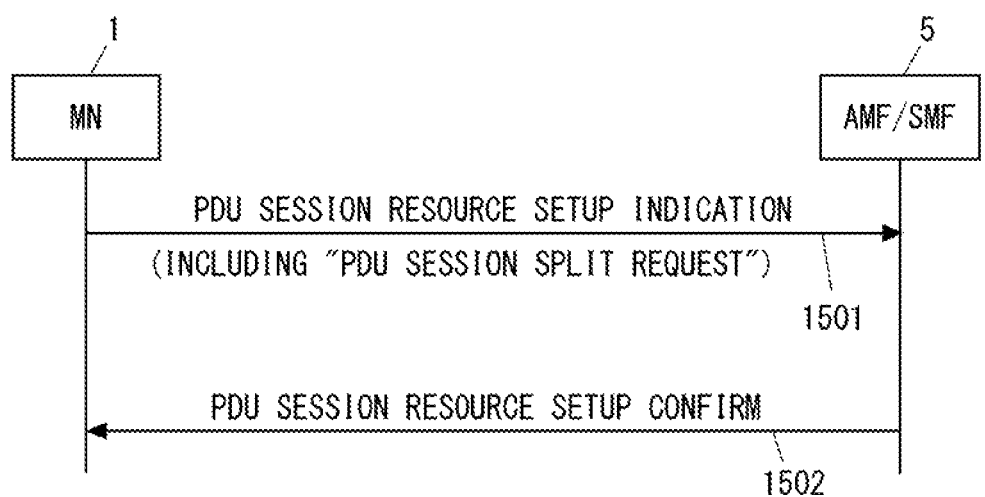
FIG. 15 is a sequence diagram showing an example of signalling regarding PDU session split according to the first embodiment.

FIG. 15 shows an example in which the new NGAP message (e.g., the PDU SESSION RESOURCE SETUP INDICATION message) is used. In Step 1501, the MN 1 sends the PDU SESSION RESOURCE SETUP INDICATION message including a PDU session split request to the AMF/SMF entity 5. In Step 1502, the AMF/SMF entity 5 sends the PDU SESSION RESOURCE SETUP CONFIRM message to the MN 1. This PDU SESSION RESOURCE SETUP CONFIRM message corresponds to the response message shown in Step 1002 in FIG. 10 (and Step 1103 in FIG. 11).

The PDU SESSION RESOURCE SETUP INDICATION message may include a "PDU Session Request To Be Setup List" Information Element (IE). FIG. 16 shows an example of a format of the "PDU Session Request To Be Setup List" IE. The "PDU Session Request To Be Setup List" IE includes a "PDU Session Request To Be Setup Item IEs" IE. The "PDU Session Request To Be Setup Item IEs" IE includes a "PDU Session ID" IE and a "DL TNL Information" IE. The "PDU Session ID" IE indicates a PDU Session ID of a PDU session to be split over two or more RAN nodes. The "DL TNL Information" IE indicates a DL TNL address and a TEID for the PDU session specified by the "PDU Session ID" IE. Further, in the example shown in FIG. 16, the "PDU Session Request To Be Setup List" IE includes a "QoS Flow Request To Be Modified List" IE. The "QoS Flow Request To Be Modified List" IE includes identifiers (i.e., QoS Flow Indicators (QFIs)) of respective QoS flows to be moved from the MN 1 to the SN 2. The "PDU Session Request To Be Setup List" IE may be named a "PDU Session Request To Be Added List" IE.

As understood from the above description, in this embodiment, the MN 1 is configured to: send to the core network 4 a modification request for an already established PDU session; and include, in the modification request, a request (or an indication or an information element) that implicitly or explicitly indicates whether or not the PDU session split is needed for this already established PDU session. Further, the AMF/SMF entity 5 is configured to receive the modification request. This enables the AMF/SMF entity 5 to properly determine whether the PDU session is to be split over two or more RAN nodes (e.g., the MN 1 and the SN 2), or to be moved to the other RAN node (e.g., the SN 2), when performing modification of the PDU session.

Note that, in the PDU session split in this embodiment, some of the QoS flows of a PDU session having been transferred via the MN 1 may be moved to one or more SNs 2. More specifically, the PDU session split in this embodiment includes a case where a PDU session already established at the MN 1 for the UE 3 is split over the MN 1 and at least one SN including the SN 2. In addition, the PDU session split in this embodiment includes a case where a PDU session already established at the MN 1 for the UE 3 is moved from the MN 1 to the SN 2, and the moved PDU session is split over the SN 2 and at least one other SN.

Further, in the PDU session split in this embodiment, some of the QoS flows of a PDU session having been transferred via the SN 2 may be moved to the MN 1. More specifically, the PDU session split in this embodiment includes a case where a PDU session already established at the SN 2 for the UE 3 is split over the SN 2 and the MN 1. In addition, the PDU session split in this embodiment includes a case where a PDU session already established at the SN 2 for the UE 3 is moved from the SN 2 to the MN 1, and the moved PDU session is split over the MN 1 and at least one other SN.

Still further, in the PDU session split in this embodiment, a new QoS flow to be associated with a PDU session having been already configured for either one of the MN 1 and the SN 2 may be added to the other one of the MN 1 and the SN 2. In this case, the AMF/SMF entity 5 may configure a new QoS flow associated with the already established PDU session in response to receiving from the MN 1 the modification request for the already established PDU session (which implicitly or explicitly indicates that the PDU session split is needed). At this time, the MN 1 and the SN 2 may map the new QoS flow to an existing Data Radio Bearer (DRB). Alternatively, the MN 1 and the SN 2 may establish a new DRB and map the new QoS flow thereto.

When the PDU session split is needed, the AMF/SMF entity 5 controls the UPF entity 6 to move a specific one or more QoS flows of a plurality of QoS flows associated with the already established PDU session from an NG-U tunnel toward the MN 1 to an NG-U tunnel toward the SN 2 (Step 1102).

Second Embodiment

This embodiment provides another improvement for the PDU session split. A configuration example of a radio communication network according to this embodiment is similar to that in the example shown in FIG. 9.

In this embodiment, the AMF/SMF entity 5 is configured to send to a RAN node (e.g., a gNB or an eNB to serve as the MN 1 in the future), during a PDU session establishment procedure performed before the transmission of the modification request for the PDU session split described in the first embodiment, an indication indicating, on a per-PDU session basis or on a per-QoS flow basis, whether or not the PDU session split is permitted (or whether or not the PDU session split can be performed) for the PDU session. The RAN node is configured to receive from the AMF/SMF entity 5, during the PDU session establishment procedure, the indication indicating, on a per-PDU session basis or on a per-QoS flow basis, whether or not the PDU session split is permitted for the PDU session.

The indication may be included in a message sent by the AMF/SMF entity 5 to the RAN node to request setup of PDU session resources for the PDU session.

In some implementations, when initiating the DC, the MN 1 may determine whether or not to request the core network 4 to perform the PDU session split, based on the indication indicating whether or not the PDU session split is permitted, which has been received in the PDU session establishment procedure.

Figure 17:
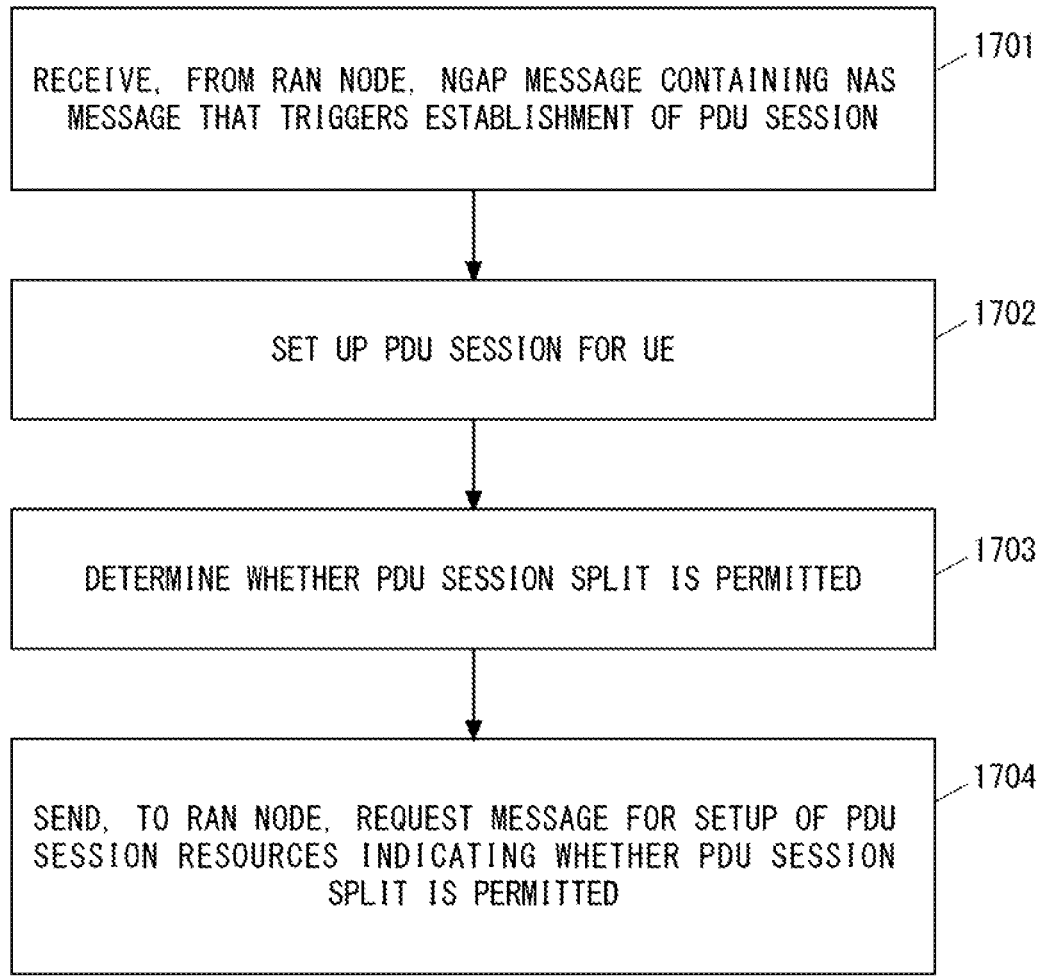
FIG. 17 is a flowchart showing an example of an operation of a control plane function entity according to a second embodiment.

FIG. 17 is a flowchart showing an example of the operation of the core network 4 according to this embodiment. The procedure shown in FIG. 17 is performed by the AMF/SMF entity 5. In Step 1701, the AMF/SMF entity 5 receives, from a RAN node (e.g., a gNB or an eNB to serve as the MN 1 in the future), an NGAP message containing an NAS message that triggers an establishment of a PDU session for the UE 3. For example, the NAS massage may be an Attach Request message for an initial attach to the core network 4 and for setup of a default PDU session. In this case, the NGAP message may be an INITIAL UE MESSAGE message. In addition or alternatively, the NAS message may be a PDU Session Establishment Request message transmitted by the UE 3 to newly request an establishment of a (initial or additional) PDU session. In this case, the NGAP message may be an INITIAL UE MESSAGE message or an UPLINK NAS TRANSPORT message.

In Step 1702, the AMF/SMF entity 5 controls the UPF entity 6 to set up a PDU session for the UE 3. In Step 1703, the AMF/SMF entity 5 determines whether or not the PDU session split for the PDU session to be newly established is permitted. In Step 1704, the AMF/SMF entity 5 sends to the RAN node a request message for setup of PDU session resources. This message indicates whether the PDU session split is permitted or not.

Figure 18:
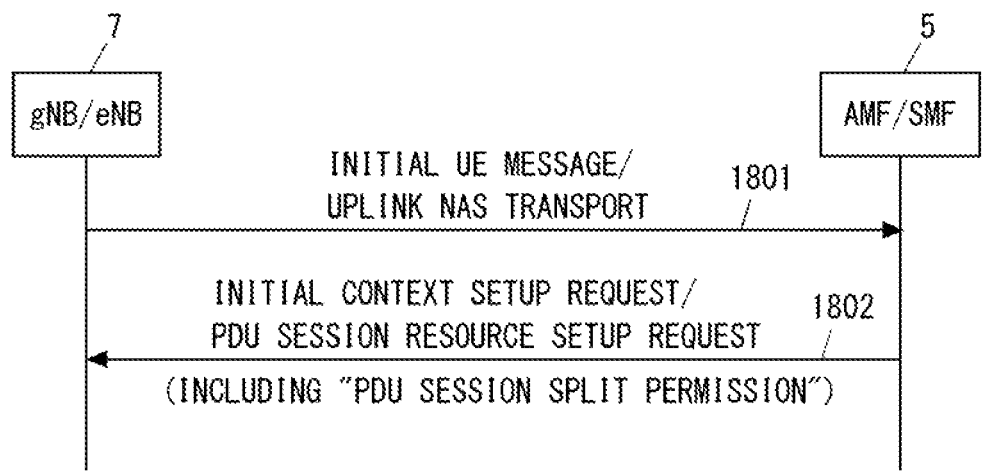
FIG. 18 is a sequence diagram showing an example of signalling regarding PDU session split according to the second embodiment.

FIG. 18 is a sequence diagram showing an example of signaling performed in the PDU session establishment procedure. In Step 1801, a RAN node 7 (e.g., a gNB or an eNB to serve as the MN 1 in the future) sends an NGAP: INITIAL UE MESSAGE message, or an NGAP: UPLINK NAS TRANSPORT message, to the AMF/SMF entity 5. The NGAP message in Step 1801 contains a NAS message (e.g., PDU Session Establishment Request) that triggers establishment of a PDU session for the UE 3.

In Step 1802, the AMF/SMF entity 5 sends an NGAP: INITIAL CONTEXT SETUP REQUEST message or an NGAP: PDU SESSION RESOURCE SETUP REQUEST message, to the RAN node 7. The NGAP message in Step 1802 is sent to the RAN node 7 in order to request setup of PDU session resources for the PDU session to be established for the UE 3. The NGAP message in Step 1802 includes the indication, which indicates whether or not the PDU session split is permitted for the PDU session on a per-PDU session basis or on a per-QoS flow basis. The indication may be, for example, a "PDU Session Split Permission Indication" IE, a "PDU Session Split" IE (which is set to "allowed" or "not-allowed"), or a "PDU Session Split Support" IE (which is set to "support" or "not-support").

As understood from the above description, in this embodiment, the AMF/SMF entity 5 is configured to send to a RAN node, during a PDU session establishment procedure, an indication indicating, on a per-PDU session basis or on a per-QoS flow basis, whether or not the PDU session split is permitted for this PDU session. The RAN node is configured to receive from the AMF/SMF entity 5, during the PDU session establishment procedure, the indication indicating on a per-PDU session basis or on a per-QoS flow basis whether or not the PDU session split is permitted for the PDU session. This enables the RAN node (i.e., a gNB or an eNB to serve as the MN 1 in the future) to operate to selectively request the core network 4 to perform the PDU session split only for a PDU session(s) (or a QoS flow(s)) for which the PDU session split has been permitted in advance.

Note that, this embodiment has described the example in which the indication indicating, on a per-PDU session basis or on a per-QoS flow basis, whether or not the PDU session split is permitted (or can be performed) is used. However, the AMF/SMF entity 5 may not have to determine, on a per-PDU session basis or on a per-QoS flow basis, whether or not to permit the PDU session split (or whether or not to support the PDU session split). In other words, although the indication is sent per PDU session (or per QoS flow) to be established (i.e., to be requested for establishment), the contents of the indication may be common among a plurality of PDU sessions (and a plurality of QoS flows contained therein) to be controlled by the AMF/SMF entity 5.

Third Embodiment

This embodiment provides a modification of the second embodiment. A configuration example of a radio communication network according to this embodiment is similar to that in the example shown in FIG. 9.

The AMF/SMF entity 5 may send to the RAN node 7 an indication on a per-UE basis which indicates whether or not the PDU session split is permitted (or can be performed). In this case, the AMF/SMF entity 5 may determine whether or not to permit the PDU session split on a per-UE basis. In some implementations, the AMF/SMF entity 5 may send to the RAN node 7, during a procedure of a PDU session establishment for the UE 3, the per-UE indication indicating whether or not the PDU session split is permitted for the UE 3.

This enables the RAN node 7 (i.e., a gNB or an eNB to serve as the MN 1 in the future) to operate to selectively request the core network 4 to perform the PDU session split only for a PDU session(s) (or a QoS flow(s)) of the UE 3 for which the PDU session split has been permitted in advance.

Fourth Embodiment

This embodiment provides still another improvement for the PDU session split. A configuration example of a radio communication network according to this embodiment is similar to that in the example shown in FIG. 9.

In this embodiment, the AMF/SMF entity 5 is configured to send to a RAN node an indication indicating whether or not the PDU session split is permitted (or whether or not the PDU session split can be performed), during a procedure of setting up or modifying a signaling connection (i.e., NG2/NG-C interface) between the AMF/SMF entity 5 and the RAN node (e.g., gNB or eNB to serve as the MN 1 in the future), which is performed before the transmission of the modification request for the PDU session split described in the first embodiment. The RAN node is configured to receive the indication indicating whether or not the PDU session split is permitted (or whether or not the PDU session split can be performed) from the AMF/SMF entity 5 during the procedure of setting up or modifying the signaling connection with the AMF/SMF entity 5.

The indication may be an indication on a per-AMF/SMF basis. Alternatively, the indication may indicate, on a per-UPF basis, whether the PDU session split is permitted (or can be performed). In addition or alternatively, the indication may indicate, on a per-network-slice basis, whether the PDU session split is permitted (or can be performed).

The 5G System supports network slicing. The network slicing enables a plurality of virtualized logical networks to be generated on a physical network by using Network Function Virtualization (NFV) technologies and software-defined networking (SDN) technologies. Each virtualized logical network is referred to as the network slice or a network slice instance, includes logical nodes and functions, and is used for specific traffic or signaling. The NG-RAN or the 5GC or both include a Slice Selection Function (SSF). The SSF selects one or more network slices suited to a 5G UE based on information provided by at least one of the 5G UE or the 5GC.

Accordingly, in some implementations, the core network 4 may provide a plurality of network slices. The plurality of network slices are distinguished from one another according to, for example, services or use cases provided to the UE 3 on the respective network slices. The use cases include, for example, enhanced Mobile Broad Band (eMBB), Ultra Reliable and Low Latency Communication (URLLC), and massive Machine Type Communication (mMTC). These are referred to as slice types (e.g., Slice/Service Type (SST)).

Further, the MN 1 or the SN 2 or both may support one or more network slices. In other words, one or more network slices may be available in cells of the MN 1 and the SN 2. In some implementations, in order to provide end-to-end network slicing to the UE 3, the MN 1 or the SN 2 or both may assign, to the UE 3, a RAN slice and a radio slice associated with a network slice of the core network 4 (referred to as a Core Network (CN) slice) selected for the UE 3.

The use of the above-described indication, sent from the AMF/SMF entity 5 to a RAN node (e.g., a gNB or an eNB to serve as the MN 1 in the future), indicating on a per-network-slice (per-CN-slice) basis whether the PDU session split is permitted provides advantages, for example, as described below.

For example, when performing CN slice selection for the UE 3, the MN 1 may take into account whether each of the CN slices has permitted the PDU session split. This enables the MN 1, for example, to select a CN slice for which the PDU session split has been permitted for a UE 3 that is scheduled to execute the DC in the future.

Further, this enables the MN 1, for example, to selectively request the core network 4 to perform the PDU session split only for a PDU session utilizing a CN slice for which the PDU session split has been permitted in advance.

Still further, this enables the MN 1, for example, to request the core network 4 to switch a PDU session utilizing a CN slice for which the PDU session split has not been permitted to another CN slice at the time of initiating the DC with regard to the PDU session.

Figure 19:
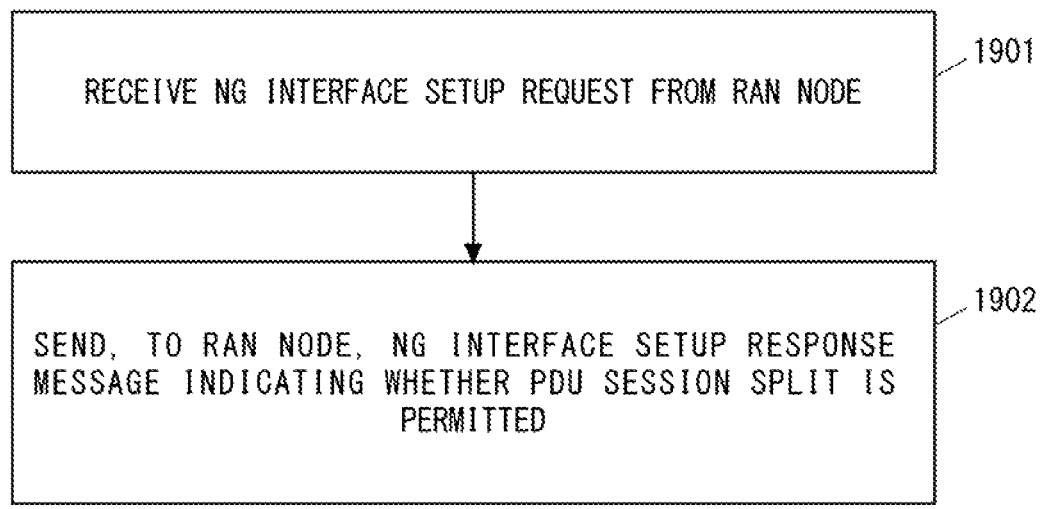
FIG. 19 is a flowchart showing an example of an operation of a control plane function entity according to a fourth embodiment.

FIG. 19 is a flowchart showing an example of the operation of the core network 4 according to this embodiment. The procedure shown in FIG. 19 is performed by the AMF/SMF entity 5. In Step 1901, the AMF/SMF entity 5 receives an NG interface setup request from a RAN node (e.g., a gNB or an eNB to serve as the MN 1 in the future). In Step 1902, the AMF/SMF entity 5 sends to the RAN node (e.g., the MN 1) an NG interface setup response message indicating whether or not the PDU session split is permitted (or whether or not the PDU session split can be performed).

Figure 20:
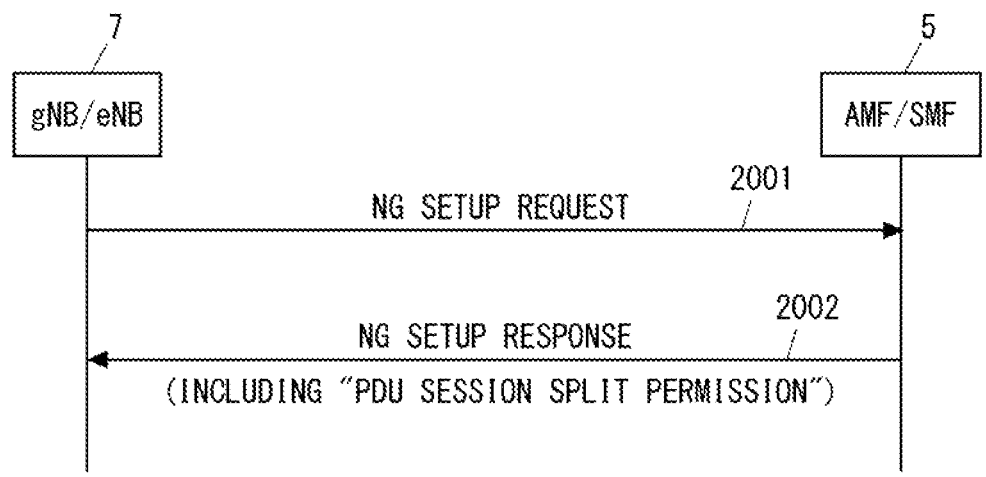
FIG. 20 is a sequence diagram showing an example of signalling regarding PDU session split according to the fourth embodiment.

FIG. 20 is a sequence diagram showing an example of signaling performed in an NG setup procedure. The NG setup procedure enables the RAN node 7 (e.g., a gNB or an eNB to serve as the MN 1 in the future) and the AMF/SMF entity 5 to correctly interoperate on the N2 interface (the NG-C interface).

In Step 2001, the RAN node 7 sends an NG SETUP REQUEST message to the AMF/SMF entity 5. In Step 2002, the AMF/SMF entity 5 sends an NG SETUP RESPONSE message to the RAN node 7. The NG SETUP RESPONSE message includes an indication indicating whether or not the PDU session split is permitted. The indication may be, for example, a "PDU Session Split Permission Indication" IE, a "PDU Session Split" IE (which is set to "allowed" or "not-allowed"), or a "PDU Session Split Support" IE (which is set to "support" or "not-support"). As already described, the indication may indicate whether the PDU session split is permitted (or can be performed) on a per-network-slice (per-CN-slice) basis.

As understood from the above description, in this embodiment, the AMF/SMF entity 5 is configured to send to a RAN node, during an NG setup procedure, an indication indicating whether or not the PDU session split is permitted (or can be performed). The RAN node is configured to receive from the AMF/SMF entity 5, during the NG setup procedure, the indication indicating whether or not the PDU session split is permitted. This enables the RAN node (i.e., a gNB or an eNB to serve as the MN 1 in the future) to operate to request the core network 4 to perform the PDU session split only when the PDU session split has been permitted in advance.

Fifth Embodiment

This embodiment provides yet another improvement for the PDU session split. A configuration example of a radio communication network according to this embodiment is similar to that in the example shown in FIG. 9.

In this embodiment, the MN 1 is configured to send to the SN 2 a Secondary Cell Group (SCG) addition request message, which requests allocation of resources for a PDU session (or a QoS flow(s) of the PDU session) to be used in the Dual Connectivity (DC) for the UE 3. The SN 2 is configured to receive the SCG addition request message from the MN 1. Further, the SCG addition request message implicitly or explicitly indicates that the PDU session split is applied to a PDU session that has already been established between the UE 3 and the UPF entity 6 in the core network 4. The SCG addition request message may be an SgNB ADDITION REQUEST message (or an SN ADDITION REQUEST message).

In some implementations, the SCG addition request message may include PDU session establishment type information (e.g., a "PDU Session Establishment Type" Information Element (IE)) explicitly indicating that the PDU session split is to be applied to the PDU session or one or more QoS flows of the PDU session. For example, the PDU session establishment type information may be one of the optional elements (optional IEs) included in the SCG addition request message. In this case, the SN 2 may recognize that the PDU session split is applied to the PDU session when the PDU session establishment type information is included in the SCG addition request message (or when this information has been set to "Split").

Figure 21:
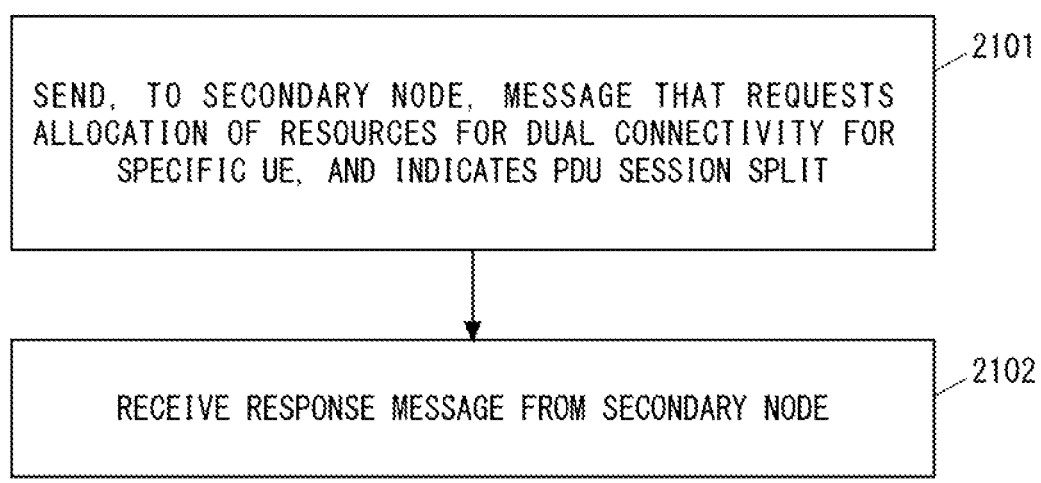
FIG. 21 is a flowchart showing an example of an operation of a master node according to a fifth embodiment.

FIG. 21 is a flowchart showing an example of the operation of the MN 1. In Step 2101, the MN 1 sends, to the SN 2, an SCG addition request message to move some of the QoS flows of an already established PDU session to the SN 2. The SCG addition request message requests allocation of resources for the PDU session (or the QoS flow(s) in the PDU session) to be used in the DC for the UE 3, and indicates the PDU session split. In Step 2102, the MN 1 receives a response message (e.g., an SN ADDITION REQUEST ACKNOWLEDGE message) from the SN 2.

Figure 22:
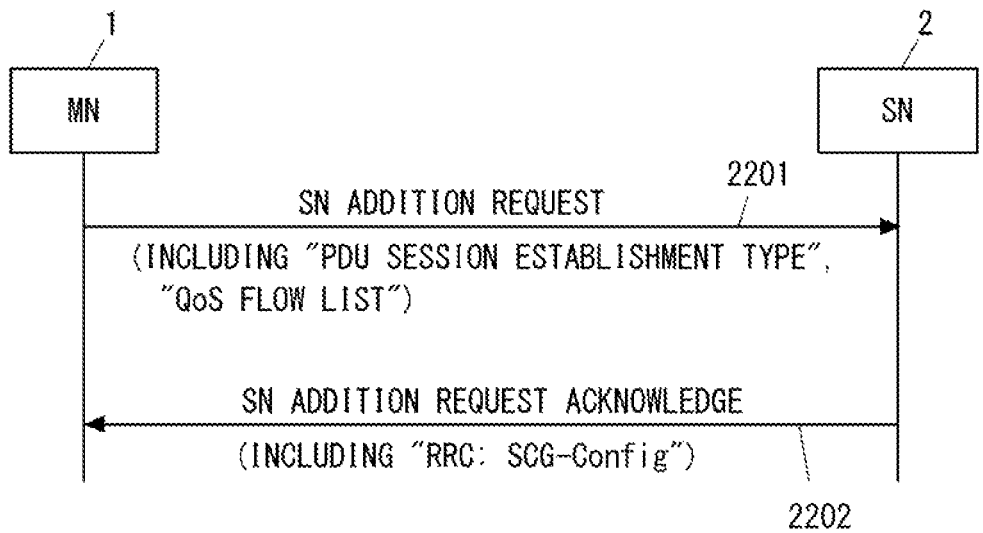
FIG. 22 is a sequence diagram showing an example of signalling regarding PDU session split according to the fifth embodiment.

FIG. 22 is a sequence diagram showing an example of signaling performed in an SgNB (or SN) addition preparation procedure. In Step 2201, the MN 1 sends an SN ADDITION REQUEST message to the SN 2. The SN ADDITION REQUEST message includes a "PDU Session ID" (IE), a "PDU Session Establishment Type" IE, and a "QoS Flow List" IE. The "PDU Session ID" IE indicates an identifier of at least any of: a PDU session to be moved from the MN 1 (i.e., MCG) to the SN 2 (i.e., SCG); a PDU session having been established at the MN 1 (i.e., MCG) and to be split by the AMF/SMF entity 5 from the UPF entity 6 over the MN 1 (i.e., MCG) and the SN 2 (i.e., SCG); and a PDU session to be newly established at the SN 2 (i.e., SCG). The "PDU Session Establishment Type" IE indicates whether or not the PDU session split has been applied to the PDU session to be added to the SN 2. The "QoS Flow List" IE indicates one or more QoS flows that have been included in the PDU session to be added to the SN 2 and are to be moved from the MN 1 (i.e., MCG) to the SN 2 (i.e., SCG) or to be newly established at the SN 2 (i.e., SCG).

The SN ADDITION REQUEST message further includes a "Bearer Option" IE as one of the mandatory IEs. The "Bearer Option" IE indicates a type of a Data Radio Bearer (DRB) (i.e., an SCG bearer, an MCG split bearer, or an SCG split bearer) to be configured in the SCG. Accordingly, the "PDU Session Establishment Type" IE and the "QoS Flow List" IE described above may be associated with the "Bearer Option" IE indicating the SCG bearer or the SCG split bearer. In other words, the "PDU Session Establishment Type" IE and the "QoS Flow List" IE described above may be contained in the "Bearer Option" IE indicating the SCG bearer or the SCG split bearer. The MCG split bearer and the SCG split bearer may be collectively indicated as a Split bearer, or indicated as a Split bearer anchored at MN (MCG) and a Split bearer anchored at SN (SCG).

The SN ADDITION REQUEST message includes information about a Secondary Cell Group (SCG) configuration (i.e., RRC: SCG-ConfigInfo). For example, the information about the SCG configuration includes a list of DRBs requested by the MN 1 to be added to the SN 2. The DRB list indicates an association among a PDU session identifier (i.e., PDU Session ID) in the MCG, a DRB identifier (i.e., a DRB Identity), and identifiers of one or more QoS flows (i.e., QFIs). Alternatively, the information about the SCG configuration may indicate an association among an identifier of a PDU session requested by the MN 1 to be added to the SN 2 (i.e., a PDU Session ID) and identifiers of one or more QoS flows (i.e., QFIs). Further, the information about the SCG configuration may include information explicitly indicating the PDU session split (e.g., PDU session type information or DRB type information). Still further, the information about the SCG configuration may include part of a Master Cell Group (MCG) configuration (e.g., an MCG Configuration) made by the MN 1 for the UE 3. For example, the MCG configuration includes a dedicated radio resource configuration of an MCG cell (e.g., a "RadioResourceConfigDedicatedMCG" IE). The dedicated radio resource configuration of an MCG cells include a list of already established DRBs. The DRB list indicates an association among a PDU session identifier (i.e., PDU Session ID), a DRB identifier (i.e., DRB Identity), and an identifier(s) of one or more QoS flows (i.e., QFIs). The MCG configuration may include information explicitly indicating the PDU session split (e.g., PDU session type information or DRB type information).

In Step 2202, the SN 2 sends an SN ADDITION ACKNOWLEDGE message to the MN 1. The SN ADDITION ACKNOWLEDGE message includes a Secondary Cell Group (SCG) configuration (i.e., RRC: SCG-Config). The SCG configuration includes a list of SCG cells to be added (i.e., a Primary Secondary Cell (PSCell) or zero or more SCG SCells), a dedicated radio resource configuration per SCG cell (e.g., a "RadioResourceConfigDedicatedSCG" IE). The dedicated radio resource configuration per SCG cell includes a list of DRBs to be added. The DRB list indicates an association among a PDU session identifier (i.e., PDU Session ID), a DRB identifier (i.e., DRB Identity), and identifiers of one or more QoS flows (i.e., QFIs). The SCG configuration may include information explicitly indicating the PDU session split (e.g., PDU session type information or DRB type information).

Note that, instead of or together with the PDU session identifier, an identifier of an SDAP entity associated with the PDU session (e.g., an SDAP Identity, or a Service Channel Identity indicating an association between an SDAP layer and a PDCP layer) may be used. For example, the Service Channel Identity may be specified as a Service Access Point (SAP) between the SDAP entity and each PDCP entities to be connected thereto. Further, the SDAP entity identifier may be allocated by the MN 1. The MN 1 may notify the SN 2 of this identifier using one of the information elements included in the SN ADDITION REQUEST message (e.g., SDAP-Config in RRC: SCG-ConfigInfo), and the SN 2 may use it. Still further, SDAP entities associated with the same PDU session identifier subjected to the PDU session split may be assigned the same SDAP entity identifier.

The movement (i.e., offloading) of one or more QoS flows from the MN 1 to the SN 2 may be performed on a per-DRB basis or on a per-QoS flow basis. In the offloading on a per-DRB basis, all the QoS flows in a single MCG bearer or MCG split bearer are moved to an SCG bearer or SCG split bearer. The SCG bearer or SCG split bearer corresponding to a DRB to which these QoS flows have been mapped (included) is newly established by an SN Addition procedure. At this time, the SN 2 (i.e., SCG) configures the same mapping (containment relationship) between QoS flows and a DRB as the MN 1 (i.e., MCG). Further, the SN 2 (i.e., SCG) may map other QoS flows, to be newly established at the SN 2 (i.e., SCG) in the SN Addition procedure, into the same DRB as the QoS flows to be moved from the MN 1 (i.e., MCG) to the SN 2 (i.e., SCG). Alternatively, QoS flows that have been mapped to the same DRB at the MN 1 (i.e., MCG) may be mapped to separate DRBs at the SN 2 (i.e., SCG). Such mapping between QoS flows and a DRB(s) at the SN 2 (i.e., SCG) may be designated to the SN 2 by the MN 1, or the MN 1 may notify the SN 2 of the mapping between QoS flows and a DRB(s) in the MCG and the SN 2 may determine a final mapping.

As understood from the above description, in this embodiment, the MN 1 is configured to send to the SN 2 an SCG addition request message, which requests allocation of resources for the DC for the UE 3. The SN 2 is configured to receive the SCG addition request message from the MN 1. Further, the SCG addition request message implicitly or explicitly indicates that the PDU session split is applied to the already established PDU session between the UE 3 and the UPF entity 6 in the core network 4. This provides advantages, for example, as described below.

For example, the SN 2 is allowed to map a plurality of QoS flows of the same PDU session into a single DRB. Accordingly, the SN 2 can map, into the same DRB, both a QoS flow that the PDU session split has been applied and a QoS flow of a MCG split bearer, which belong to the same PDU session.

Further, for example, when the SN 2 moves QoS flows from the SN 2 further to another SN, or returns QoS flows from the SN 2 to the MN 1, the SN 2 can inform another SN or the MN 1 that the PDU session split has been applied to these QoS flows.

Sixth Embodiment

This embodiment provides a modification of the interaction between the MN 1 and the SN 2, which is described in the fifth embodiment. A configuration example of a radio communication network according to this embodiment is similar to that in the example shown in FIG. 9.

The MN 1 may send an inter-base-station (or inter-node) message (e.g., an XnAP message), different from the SCG addition request message, to the SN 2 in order to request preparation for allocating or modifying resources for a PDU session (and a QoS flow(s) in this PDU session) to be used in the Dual Connectivity (DC) for the UE 3. For example, the MN 1 may send a Secondary Cell Group (SCG) modification preparation request message. The SCG modification preparation request message may be an SgNB MODIFICATION REQUEST message (or an SN MODIFICATION REQUEST message). The SCG modification preparation request message requests the SN 2 to modify one or more SCG cells (i.e., the PSCell or a SCG SCell(s) or both the PSCell and the SCG SCell(s)) that have already been configured for the UE 3. The SCG modification preparation request message may be used to move some of the QoS flows of the already established PDU session for the UE 3 from the MN 1 to the SN 2. In addition or alternatively, the SCG modification preparation request message may be used to move some of the QoS flows of the already established PDU session for the UE 3 from the SN 2 to the MN 1. In these cases, the SCG modification preparation request message may implicitly or explicitly indicate that the PDU session split is to be applied to the already established PDU session.

As in the description of the fifth embodiment, the movement (i.e., offloading) of one or more QoS flows from the MN 1 to the SN 2 may be performed on a per-DRB basis or on a per-QoS flow basis. In the offloading on a per-DRB basis, all the QoS flows in a single MCG bearer or MCG split bearer are moved to an SCG bearer or SCG split bearer. The SCG bearer or SCG split bearer corresponding to a DRB to which these QoS flows have been mapped (included) may be newly established by the SN Modification procedure, or it may have already been established.

Similarly, the movement (i.e., offloading) of one or more QoS flows from the SN 2 to the MN 1 may be performed on a per-DRB basis or on a per-QoS flow basis. In the offloading on a per-DRB basis, all the QoS flows in a single SCG bearer or SCG split bearer are moved to an MCG bearer or MCG split bearer. The MCG bearer or MCG split bearer corresponding to a DRB to which these QoS flows have been mapped (included) may be newly established by the SN Modification procedure, or it may have already been established.

The interaction between the MN 1 and the SN 2, described in this embodiment, is applicable also to a case where a split PDU session (or a QoS flow(s) in this PDU session) is to be merged (unified) into a single RAN node. For example, a PDU session that has been split from the MN 1 to the SN 2 may be merged again into the MN 1. Alternatively, all the QoS flows left at the MN 1 with regard to a PDU session having been split from the MN 1 to the SN may be moved to the SN 2. Similarly, a PDU session that has been split from the SN 2 to the MN 1 may be merged again into the SN 2. Alternatively, all the QoS flows left at the SN 2 with regard to a PDU session having been split from the SN 2 to the MN 1 may be moved to the MN 1.

The SN Modification procedure for SCG modification, which includes the SCG modification preparation request message, may be initiated from the MN 1 itself. Alternatively, the SN Modification procedure may be initiated from the SN 2 by transmitting an SCG modification request message requesting the MN 1 to perform the SN modification procedure. The SCG modification request message may be an SgNB MODIFICATION REQUIRED message (or an SN MODIFICATION REQUIRED message).

Further, the information elements included in the SCG addition request message, which are described in the fifth embodiment, may be included in the SCG modification preparation request message or the SCG modification request message or both. The names or the configurations of the information elements may be changed. For example, the "PDU Session Establishment Type" IE may be replaced with a "PDU Session Modification Type" IE. The "PDU session establishment type information (e.g., the "PDU Session Establishment Type" Information Element (IE)) may be set to "Split" when the PDU session split is to be performed, or set to "Merge (or Unify)" when the split PDU session is to be merged (unified).

Note that, instead of or together with the PDU session identifier, an identifier of an SDAP entity associated with the PDU session (e.g., an SDAP Identity, or a Service Channel Identity indicating an association between an SDAP layer and a PDCP layer) may be used. For example, the Service Channel Identity may be specified as a Service Access Point (SAP) between the SDAP entity and each PDCP entity to be connected thereto. Further, the SDAP entity identifier may be allocated by the MN 1. The MN 1 may notify the SN 2 of this identifier using one of the information elements included in the SN MODIFICATION REQUEST message (e.g., SDAP-Config in RRC: SCG-ConfigInfo), and the SN 2 may use it. Still further, SDAP entities associated with the same PDU session identifier subjected to the PDU session split may be assigned the same SDAP entity identifier.

Seventh Embodiment

This modification provides yet another improvement for the PDU session split. A configuration example of a radio communication network according to this embodiment is similar to that in the example shown in FIG. 9.

In this embodiment, the MN 1 or the SN 2 is configured to transmit to the UE 3 an RRC connection reconfiguration message indicating a Secondary Cell Group (SCG) configuration for the DC. The UE 3 is configured to receive the RRC connection reconfiguration message from the MN 1 or the SN 2. The RRC connection reconfiguration message further indicates, implicitly or explicitly, that the PDU session split is applied to one or more QoS flows, or one or more Data Radio Bearers (DRBs), to be moved from the MN 1 (i.e., MCG) to the SN 2 (i.e., SCG). In other words, the RRC connection reconfiguration message implicitly or explicitly indicates that the PDU session split is applied to an already established PDU session between the UE 3 and the core network 4.

As an example, in order to implicitly or explicitly indicate the PDU session split, secondary cell group configuration information (e.g., an SCG Configuration) included in the RRC connection reconfiguration message may include information about a PDU session (e.g., a PDU session identifier, or PDU session type information). For example, the secondary cell group configuration information may indicate an association among an identifier of an already established PDU session in the Master Cell Group (MCG) (i.e., a PDU Session ID), one or more QoS flows included in this PDU session and to be moved from the MN 1 (i.e., MCG) to the SN 2 (i.e., SCG), and a data radio bearer containing the one or more QoS flows.

For example, in order to implicitly indicate the PDU session split, configuration information (e.g., a "DRB-ToAddModSCG" IE) of a DRB(s) to be established in the SCG, contained in the Secondary Cell Group (SCG) configuration information e (e.g., an "SCG Configuration" IE), may include a PDU session identifier (i.e., a PDU Session ID), a QoS flow identifier (i.e., a QoS Flow Indicator (QFI)), and a DRB identifier (i.e., a DRB Identity). The configuration information (e.g., a "DRB-ToAddModSCG" IE) of a DRB(s) to be established in the SCG may further include information about the corresponding DRB type (e.g., MCG split, SCG, or SCG split).

Alternatively, in order to explicitly indicate the PDU session split, the configuration information (e.g., a "DRB-ToAddModSCG" IE) of a DRB(s) to be established in the SCG, included in the SCG configuration information (e.g., an "SCG Configuration" IE) may include PDU session type information (e.g., PDU-SessionType (set to "split")). The PDU session type information may be set to "non-split" when the PDU session split is not performed. Alternatively, the PDU session type information may be included only when the PDU session split is performed. Further, the configuration information of a DRB(s) may include a PDU session identifier (i.e., a PDU Session ID), a QoS flow identifier (i.e., a QoS Flow Indicator (QFI)), a DRB identifier (i.e., a DRB Identity), and information about the corresponding DRB type (e.g., MCG split, SCG, or SCG split).

In addition or alternatively, in order to explicitly indicate the PDU session split, the Secondary Cell Group (SCG) configuration information (e.g., a SCG Configuration) may include an indication explicitly indicating that the PDU session split is to be applied to a PDU session, or one or more QoS flows, already established in the MCG. This indication may be, for example, data-radio-bearer type information. The data-radio-bearer type information may indicate a data-radio-bearer type indicating that the PDU session split has been applied, such as a "PDU session Split (PS) SCG bearer" or a "PDU session Split (PS) SCG split bearer".

All or some of the information elements (IEs) included in the above-described Secondary Cell Group (SCG) configuration information (e.g., an SCG Configuration) may be generated by the SN 2, and transferred from the SN 2 to the MN 1. Further, the MN 1 may transmit the information element(s) transparently to the UE 3, and the UE 3 may receive the information element(s) in the MCG.

The above-described RRC connection reconfiguration message may include master cell group configuration information (e.g., an MCG Configuration). The master cell group configuration information (e.g., an MCG Configuration) may be transmitted together with the above-described Secondary Cell Group (SCG) configuration information (e.g., an SCG Configuration) via a single RRC connection reconfiguration message. At least one of the information elements (e.g., the PDU session identifier and the PDU session type information) included in the above-described Secondary Cell Group (SCG) configuration information (e.g., an SCG Configuration) may instead be included in the master cell group configuration information (e.g., an MCG Configuration). For example, the Master Cell Group configuration information may indicate an association among an identifier of an already established PDU session in the Master Cell Group (i.e., a PDU Session ID), one or more QoS flows included in the PDU session and not to be moved from the MN 1 (i.e., MCG) to the SN 2 (i.e., SCG), and a data radio bearer containing the one or more QoS flows.

Figure 23:
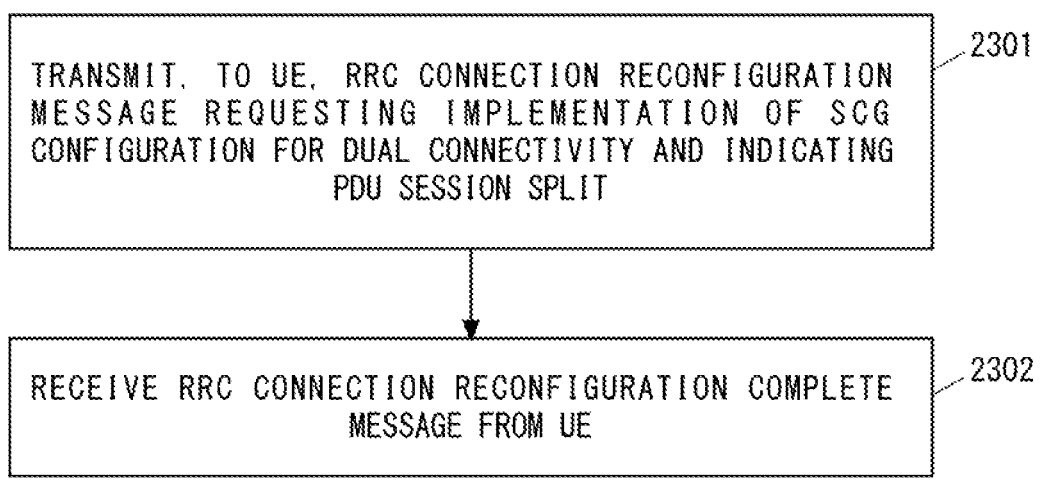
FIG. 23 is a flowchart showing an example of an operation of a master node according to a seventh embodiment.
Figure 24:
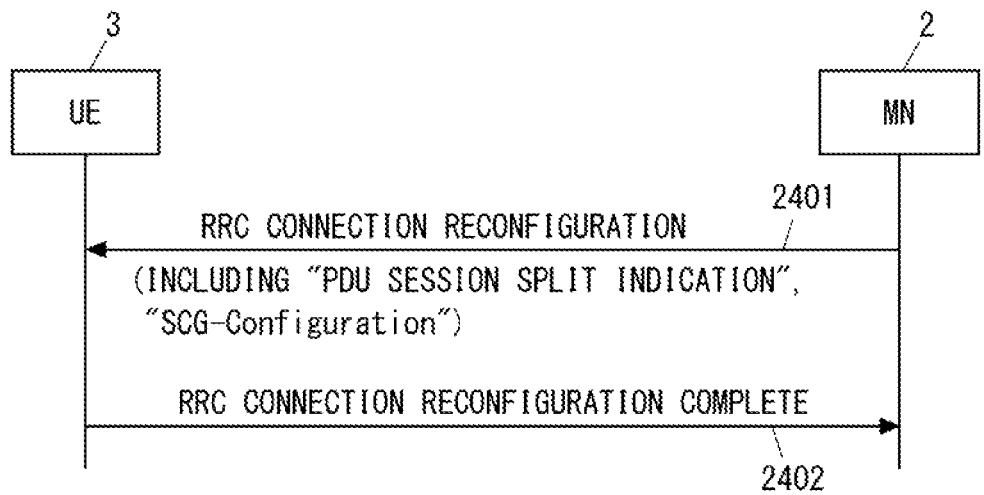
FIG. 24 is a sequence diagram showing an example of signalling regarding PDU session split according to the seventh embodiment.

FIG. 23 and FIG. 24 are flowcharts showing an example of the operation of the MN 1. In Step 2301 and Step 2401, the MN 1 transmits to the UE 3 an RRC Connection Reconfiguration message that requests implementation of an SCG configuration for the DC and indicates the PDU session split. Specifically, the RRC Connection Reconfiguration message includes the SCG-Configuration and a PDU session split indication. The PDU session split indication may be contained in the SCG-Configuration. In Step 2302 and Step 2402, the MN 1 receives an RRC Connection Reconfiguration Complete message from the UE 3. The RRC Connection Reconfiguration message may be transmitted to the UE 3 via the SN 2 (i.e., in the SCG) with use of an MCG Split SRB split from the MN 1 to the SN 2. Alternatively, the SN 2 may transmit to the UE 3, via an SCG SRB, an SCG RRC Connection Reconfiguration message that includes at least part of the information contained in the RRC Connection Reconfiguration message, more specifically information that requests implementation of the SCG configuration for the DC and indicates the PDU session split.

Figure 25:
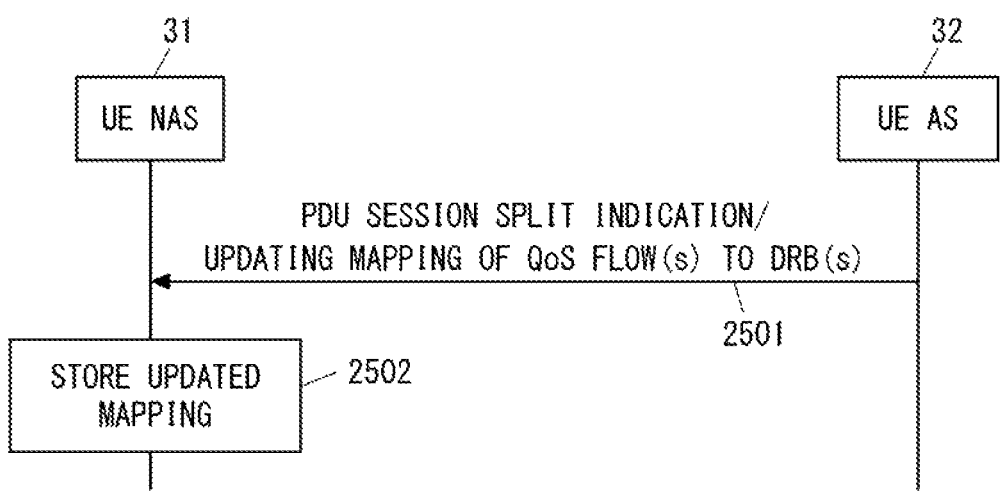
FIG. 25 is a sequence diagram showing an example of an operation of a radio terminal according to the seventh embodiment.

FIG. 25 shows an example of an interaction between an NAS layer 31 and an Access Stratum (AS) layer 32 in the UE 3. If the AS layer 32 receives from the MN 1 an RRC Connection Reconfiguration message (Step 2401 in FIG. 24) including information implicitly or explicitly indicating that the PDU session split is to be applied to an already established PDU session, the AS layer 32 indicates to an upper layer (i.e., the NAS layer 31) an indication (e.g., PDU Session Split Indication) indicating that the PDU session split is to be applied and the corresponding PDU session identifier (i.e., PDU Session ID). At this time, the AS layer 32 may also indicate a QoS flow identifier (i.e., QoS flow Indicator (QFI)) to the NAS layer 31. In addition or alternatively, the AS layer 32 may indicate, to the upper layer (i.e., the NAS layer 31), updated mapping information indicating that one or more QoS flows belonging to the already established PDU session are to be moved to a DRB in the SCG (i.e., an SCG bearer or an SCG split bearer). This enables the NAS layer 31 to recognize that a plurality of QoS flows belonging to the same PDU session are split over the MN 1 (MCG) and the SN 2 (SCG).

Alternatively, when the PDU session split is implicitly indicated in the MR-DC, the AS layer 32 of the UE 3 (e.g., an RRC layer of an SCG RAT) may indicate, to the upper layer (the UE NAS layer 31), an establishment of a Data Radio Bearer (DRB), and a QoS flow identifier and a PDU session identifier corresponding to this DRB. In this case, the upper layer may recognize that the PDU session split has been performed based on the fact that the received PDU session identifier is the same as a PDU session identifier that has already been indicated by the AS layer 32 (e.g., an RRC layer of an MCG RAT). For example, the NAS layer 31 of the UE 3 assigns a PDU session ID in a PDU session establishment request procedure initiated (triggered) by the NAS layer 31. Accordingly, the NAS layer 31 can recognize that the PDU session split has been performed, based on the fact that a PDU session ID that the NAS layer 31 itself has already allocated to the AS layer 32 of an RAT (e.g., MCG RAT) in one Cell Group (CG) is the same as another PDU session ID newly indicated by the AS layer 32 of an RAT (e.g., SCG RAT) in another CG.

Alternatively, the MCG-configuration and the SCG-configuration in the same RRC Connection Reconfiguration may both include a PDU session identifier. In this case, the UE 3 may recognize that the PDU session split has been performed, based on the fact that the PDU session identifier in the MCG-configuration is the same as that in the SCG-configuration. As an example, the UE AS layer 32 may recognize the PDU session split based on the overlapping of the PDU session identifiers and after that, indicate to the UE NAS layer 31 this PDU session identifier or that the PDU session split has been performed. Alternatively, the UE NAS layer 31 may receive both the PDU session identifier in the MCG-configuration and the PDU session identifier in the SCG-configuration from the UE AS layer 32, and recognize the PDU session split has been performed based on these two PDU session identifiers.

Note that, instead of or together with the PDU session identifier, an identifier of an SDAP entity associated with the PDU session (e.g., an SDAP Identity, or a Service Channel Identity indicating an association between a SDAP layer and a PDCP layer) may be used. As already described, the Service Channel Identity may be specified as a Service Access Point (SAP) between the SDAP entity and each PDCP entity to be connected thereto.

Eighth Embodiment

This embodiment provides an improvement related to UE mobility when the NR-NR DC involving the PDU session split is executed. A configuration example of a radio communication network according to this embodiment is similar to that in the example shown in FIG. 9.

In this embodiment, the following three mobility scenarios are assumed.

1. Change of SgNB

The first mobility scenario is Change of SgNB (or SgNB Change). This scenario is similar to the Change of SeNB scenario in DC in 3GPP Release 12 (LTE-Advanced). The Change of SgNB procedure is initiated by MgNB (i.e., the MN 1) and is used to transfer a UE context from a source SgNB (i.e., the SN 2) to a target SgNB and to change the SCG configuration (SCG config) in the UE from a configuration generated (designated) by one SgNB to a configuration to be generated (designated) by another SgNB.

The MgNB (i.e., the MN 1) initiates the Change of SgNB by requesting the target SgNB to allocate resources for the UE 3 via an SgNB (or SN) addition preparation procedure. The SgNB (or SN) addition preparation procedure is basically the same as that described in the fifth embodiment (FIGS. 21 and 22), except that the UE context to be transferred to the target SgNB by the MgNB includes the SCG configuration generated (designated) by the source SgNB. In order to inform the UPF entity 6 of update of the DL TNL information (the DL TNL address and the TEID) after the SgNB (or SN) addition preparation procedure is performed, the MgNB (i.e., the MN 1) only needs to send to the AMF/SMF entity 5 the modification request message for an already established PDU session (which indicates whether or not the PDU session split is needed), which is described in the first embodiment.

2. MgNB to gNB Change

The second mobility scenario is MgNB to gNB Change. This scenario is similar to the MeNB to eNB Change scenario in DC in 3GPP Release 12 (LTE-Advanced). The MgNB to gNB Change procedure is used to transfer context data from a source MgNB (i.e., the MN 1) and a source SgNB (i.e., the SN 2) to a target gNB.

The source MgNB (i.e., the MN 1) initiates the MgNB to gNB Change procedure by initiating an Xn Handover Preparation procedure. More specifically, the MgNB (i.e., the MN 1) sends an Xn: HANDOVER REQUEST message to the target gNB. The source MgNB (i.e., the MN 1) incorporates configuration information of the SCG (SCG configuration) into handover preparation information (a "HandoverPreparationInformation" IE) within the HANDOVER REQUEST message. The configuration information of the SCG indicates an association among a PDU session identifier (i.e., a PDU Session ID), a DRB identifier (i.e., a DRB Identity), and identifiers of one or more QoS flows (i.e., QFIs). The SCG configuration may include information explicitly indicating the PDU session split (e.g., PDU session type information or DRB type information).

Figure 26:
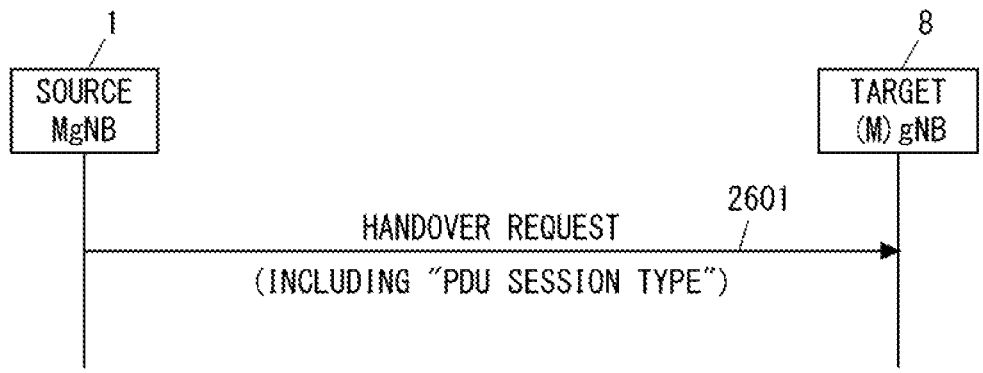
FIG. 26 is a sequence diagram showing an example of signalling regarding PDU session split according to an eighth embodiment.

FIG. 26 is a sequence diagram showing an example of signaling performed in the Xn Handover Preparation procedure. In Step 2601, the source MgNB (i.e., the MN 1) sends a HANDOVER REQUEST message to a target gNB 8. As described above, this HANDOVER REQUEST message includes the configuration information of the SCG. The HANDOVER REQUEST message may further include the information explicitly indicating the PDU session split (e.g., PDU session type information or DRB type information). This type information may be contained in the configuration information of the SCG.

3. Inter-MgNB Handover without SgNB Change

The third mobility scenario is Inter-MgNB handover without SgNB change. This scenario is similar to the Inter- MeNB handover without SeNB change scenario in DC in 3GPP Release 12 (LTE-Advanced). The Inter-MgNB handover without SgNB change procedure is used to transfer context data from a source MgNB (i.e., the MN 1) to a target MgNB that adds SgNB thereto during the handover.

The source MgNB (i.e., the MN 1) initiates the Inter-MgNB handover without SgNB change procedure by initiating an Xn Handover Preparation procedure. More specifically, the MgNB (i.e., the MN 1) sends an Xn: HANDOVER REQUEST message to the target MgNB. The source MgNB (i.e., the MN 1) incorporates a SCG configuration (an "SCG configuration" IE) into handover preparation information (a "HandoverPreparationInformation" IE) within the HANDOVER REQUEST message. Further, the source MgNB (i.e., the MN 1) incorporates both an SgNB UE XnAP ID and an SgNB ID into a "UE Context Reference at the SgNB" IE within the HANDOVER REQUEST message. These SgNB UE XnAP ID and SgNB ID are used to identify data and signaling messages regarding the UE 3 on the Xn interface of the SgNB (i.e., the SN 2).

The "SCG configuration" IE or the "UE Context Reference at the SgNB" IE may include information explicitly indicating the PDU session split (e.g., PDU session type information or DRB type information). As in the example shown in FIG. 26, the source MgNB (i.e., the MN 1) may send a HANDOVER REQUEST message to the target MgNB 8. This HANDOVER REQUEST message includes the "SCG configuration" IE and the "UE Context Reference at the SgNB" IE. Further, the HANDOVER REQUEST message may include the information explicitly indicating the PDU session split (e.g., PDU session type information or DRB type information). This type information may be contained in the "SCG configuration" IE or the "UE Context Reference at the SgNB" IE.

Figure 27:
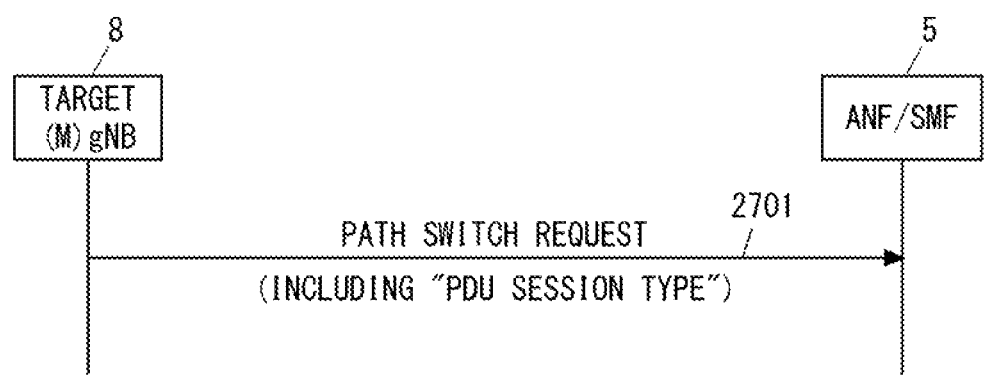
FIG. 27 is a sequence diagram showing an example of signalling regarding PDU session split according to the eighth embodiment.

In the MgNB to gNB Change procedure, in order to change both an NG-U tunnel toward the source MgNB (i.e., the MN 1) and an NG-U tunnel toward the source SgNB (i.e., the SN 2) into NG-U tunnels toward the target gNB, the target gNB requests the AMF/SMF entity 5 to perform path switching of DL GTP tunnels (i.e., NG-U (or N3) tunnels) of the respective PDU sessions, and the AMF/SMF entity 5 performs NG-U (or N3) Path Switch procedures. Also in the Inter-MgNB handover without SgNB change procedure, in order to change a NG-U tunnel toward the source MgNB (i.e., the MN 1) into an NG-U tunnel toward the target MgNB, the target gNB requests the AMF/SMF entity 5 to perform path switching of the NG-U (or N3), and the AMF/SMF entity 5 performs an NG-U (or N3) Path Switch procedure. The NG-U (or N3) Path Switch procedure is similar to the S1 Path Switch procedure in DC in 3GPP Release 12 (LTE-Advanced). Specifically, as shown in FIG. 27, the target (M) gNB 8 sends a PATH SWITCH REQUEST message to the AMF/SMF entity 5. This PATH SWITCH REQUEST message may include type information explicitly indicating the PDU session split (e.g., PDU session type information or QoS flow type information). The target (M) gNB 8 may send a NG-U (or N3) path switch request per NG-U (or N3) that has been split for a single PDU session.

When the AMF/SMF entity 5 receives a PATH SWITCH REQUEST message including this type information in the MgNB to gNB Change procedure, the AMF/SMF entity 5 determines to change both the NG-U tunnel toward the source MgNB (i.e., the MN 1) and the NG-U tunnel toward the SgNB (i.e., the SN 2), to which the PDU session split has been applied, into the NG-U tunnel toward the target gNB 8. In contrast, when the AMF/SMF entity 5 receives a PATH SWITCH REQUEST message including this type information in the Inter-MgNB handover without SgNB change procedure, the AMF/SMF entity 5 determines to change the NG-U tunnel toward the source MgNB (i.e., the MN 1), to which the PDU session split has been applied, into the NG-U tunnel toward the target MgNB 8, and recognizes that the PDU session split is to be applied to the NG-U tunnel toward the target MgNB 8.

Alternatively, the PATH SWITCH REQUEST message may include an information element explicitly indicating that a relationship between a PDU session established before the handover (and QoS flows of this PDU session) and the corresponding RAN nodes (the source MgNB1 and SgNB2) is maintained. This information element may be, for example, a "relative PDU session mapping kept" IE. By receiving this information element, the AMF/SMF entity 5 can recognize that a PDU session and QoS flows thereof that have been established in a source MgNB 1 are to be established in the target MgNB 8, and also recognize that a PDU session and QoS flows thereof that have been established in the SgNB 2 are to be maintained in the SgNB 2.

Ninth Embodiment

Each of the above-described embodiments may be used individually, or two or more of the embodiments may be appropriately combined with one another. For example, as already described, the MN 1 may request the SN 2 to allocate resources for a PDU session to which the PDU session split is to be applied, in accordance with the SN ADDITION procedure described in the fifth embodiment or the SN MODIFICATION procedure described in the sixth embodiment. After that, as described in the first embodiment, the MN 1 may send to the AMF/SMF entity 5 a modification request for the already established PDU session.

In addition or alternatively, when the MN 1 is requested by the AMF/SMF entity 5 to add a new QoS flow, the MN 1 may map the new QoS flow directly to a DRB of the SN 2 (SCG), without mapping it to a DRB of the MN 1 (MCG). More specifically, the AMF/SMF entity 5 sends an NGAP: PDU SESSION RESOURCE MODIFY REQUEST message to the MN 1 in order to request addition of a new QoS flow to an already established PDU session for the UE 3. In response to receiving this NGAP message, the MN 1 may request the SN 2 to allocate resources for the new QoS flow, in accordance with the SN ADDITION procedure described in the fifth embodiment or the SN MODIFICATION procedure described in the sixth embodiment. The SN 2 may establish a new SCG bearer for the new QoS flow, or map the QoS flow to an existing SCG bearer. In other words, the SN 2 may determine an SC bearer to which the new QoS flow is mapped. For example, in the NR-NR DC, the MN 1 or the SN 2 may determine a mapping of the new QoS flow to an SCG bearer, while, in the MR-DC, the SN 2 may determine the mapping. After the SN ADDITION procedure or the SN MODIFICATION procedure, the MN 1 may send to the AMF/SMF entity 5 a modification request for the already established PDU session, in accordance with the procedure described in the first embodiment.

Figure 28:
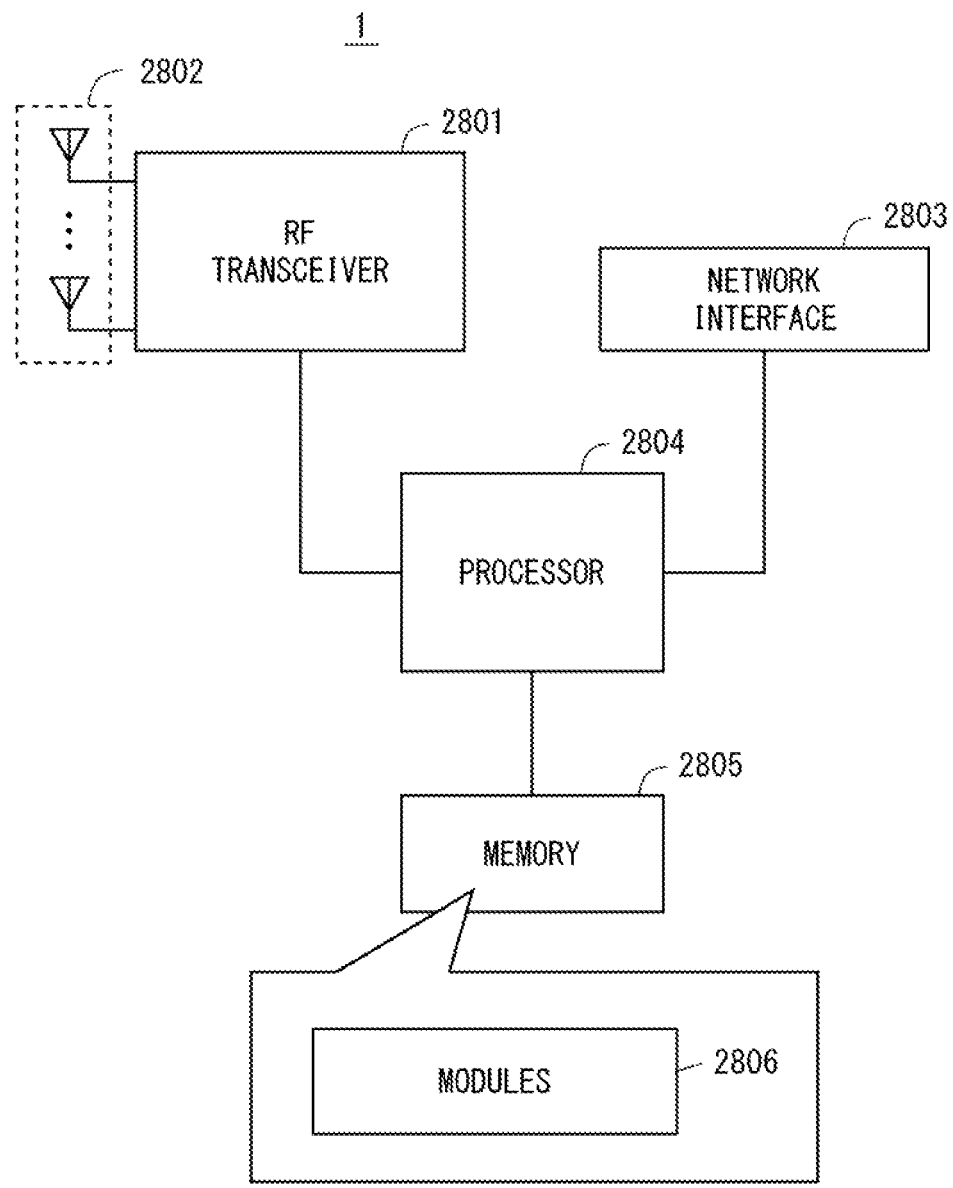
FIG. 28 is a block diagram showing a configuration example of a master node according to embodiments.

The following provides configuration examples of the MN 1, the SN 2, the UE 3, and the AMF/SMF entity 5 according to the above-described embodiments. FIG. 28 is a block diagram showing a configuration example of the MN 1 according to the above-described embodiments. The configuration of the SN 2 may be similar to that shown in FIG. 28. Referring to FIG. 28, the MN 1 includes a Radio Frequency transceiver 2801, a network interface 2803, a processor 2804, and a memory 2805. The RF transceiver 2801 performs analog RF signal processing to communicate with UEs including the UE 3. The RF transceiver 2801 may include a plurality of transceivers. The RF transceiver 2801 is coupled to an antenna array 2802 and the processor 2804. The RF transceiver 2801 receives modulated symbol data from the processor 2804, generates a transmission RF signal, and supplies the transmission RF signal to the antenna array 2802. Further, the RF transceiver 2801 generates a baseband reception signal based on a reception RF signal received by the antenna array 2802 and supplies the baseband reception signal to the processor 2804.

The network interface 2803 is used to communicate with network nodes (e.g., the SN 2, the CP node 5, and the UP node 6). The network interface 2803 may include, for example, a network interface card (NIC) conforming to the IEEE 802.3 series.

The processor 2804 performs digital baseband signal processing (i.e., data-plane processing) and control-plane processing for radio communication. The processor 2804 may include a plurality of processors. The processor 2804 may include, for example, a modem processor (e.g., a Digital Signal Processor (DSP)) that performs the digital baseband signal processing and a protocol stack processor (e.g., a Central Processing Unit (CPU) or a Micro Processing Unit (MPU)) that performs the control-plane processing.

The memory 2805 is composed of a combination of a volatile memory and a non-volatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 2805 may include a storage located apart from the processor 2804. In this case, the processor 2804 may access the memory 2805 via the network interface 2803 or an I/O interface (not shown).

The memory 2805 may store one or more software modules (computer programs) 2806 including instructions and data to perform processing by the MN 1 described in the above-described embodiments. In some implementations, the processor 2804 may be configured to load the software modules 2806 from the memory 2805 and execute the loaded software modules, thereby performing processing of the MN 1 described in the above-described embodiments.

Figure 29:
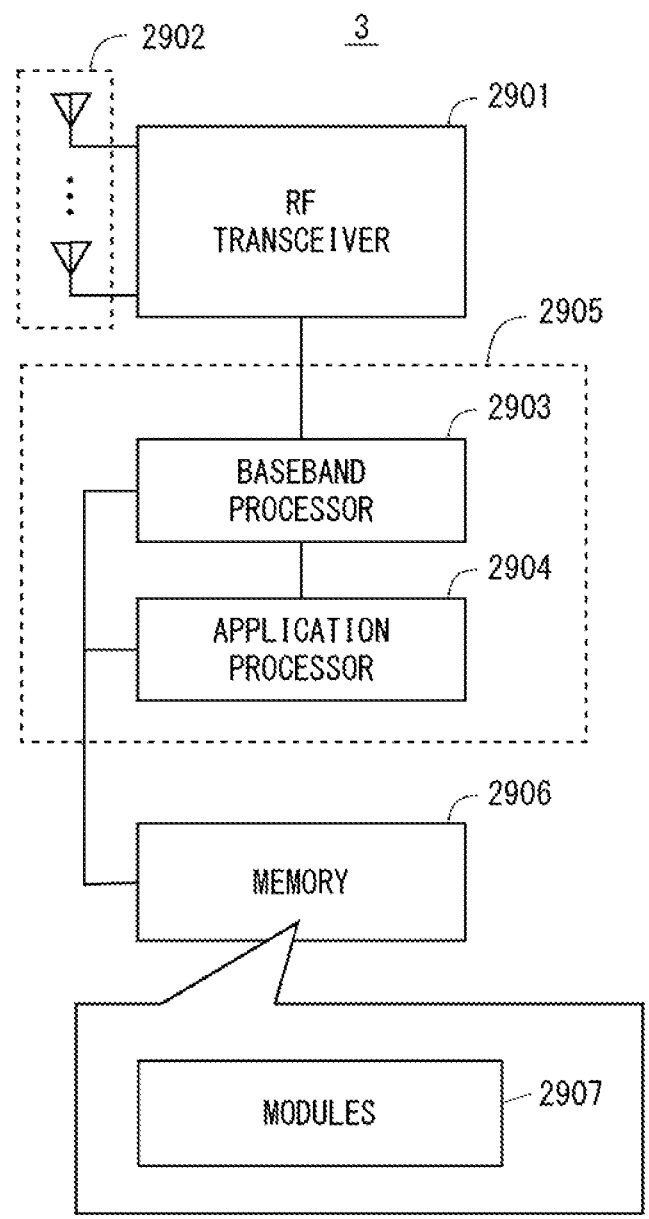
FIG. 29 is a block diagram showing a configuration example of a radio terminal according to embodiments.

FIG. 29 is a block diagram showing a configuration example of the UE 3. A Radio Frequency (RF) transceiver 2901 performs analog RF signal processing to communicate with the MN 1 and the SN 2. The RF transceiver 2901 may include a plurality of transceivers. The analog RF signal processing performed by the RF transceiver 2901 includes frequency up-conversion, frequency down-conversion, and amplification. The RF transceiver 2901 is coupled to an antenna array 2902 and a baseband processor 2903. The RF transceiver 2901 receives modulated symbol data (or OFDM symbol data) from the baseband processor 2903, generates a transmission RF signal, and supplies the transmission RF signal to the antenna array 2902. Further, the RF transceiver 2901 generates a baseband reception signal based on a reception RF signal received by the antenna array 2902 and supplies the baseband reception signal to the baseband processor 2903.

The baseband processor 2903 performs digital baseband signal processing (data-plane processing) and control-plane processing for radio communication. The digital baseband signal processing includes (a) data compression/decompression, (b) data segmentation/concatenation, (c) composition/decomposition of a transmission format (transmission frame), (d) channel coding/decoding, (e) modulation (symbol mapping)/demodulation, and (f) generation of OFDM symbol data (baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 2903 may include, for example, signal processing of a Packet Data Convergence Protocol (PDCP) layer, a Radio Link Control (RLC) layer, a MAC layer, and a PHY layer. Further, the control-plane processing performed by the baseband processor 2903 may include processing of a Non-Access Stratum (NAS) protocol, an RRC protocol, and MAC CEs.

The baseband processor 2903 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 2904 described in the following.

The application processor 2904 is also referred to as a CPU, an MPU, a microprocessor, or a processor core. The application processor 2904 may include a plurality of processors (processor cores). The application processor 2904 loads a system software program (Operating System (OS)) and various application programs (e.g., a call application, a WEB browser, a mailer, a camera operation application, and a music player application) from a memory 2906 or from another memory (not shown) and executes these programs, thereby providing various functions of the UE 3.

In some implementations, as represented by a dashed line (2905) in FIG. 29, the baseband processor 2903 and the application processor 2904 may be integrated on a single chip. In other words, the baseband processor 2903 and the application processor 2904 may be implemented in a single System on Chip (SoC) device 2905. An SoC device may be referred to as a system Large Scale Integration (LSI) or a chipset.

The memory 2906 is a volatile memory, a non-volatile memory, or a combination thereof. The memory 2906 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 2906 may include, for example, an external memory device that can be accessed from the baseband processor 2903, the application processor 2904, and the SoC 2905. The memory 2906 may include an internal memory device that is integrated in the baseband processor 2903, the application processor 2904, or the SoC 2905. Further, the memory 2906 may include a memory in a Universal Integrated Circuit Card (UICC).

The memory 2906 may store one or more software modules (computer programs) 2907 including instructions and data to perform the processing by the UE 3 described in the above-described embodiments. In some implementations, the baseband processor 2903 or the application processor 2904 may load these software modules 2907 from the memory 2906 and execute the loaded software modules, thereby performing the processing of the UE 3 described in the above-described embodiments with reference to the drawings.

Figure 30:
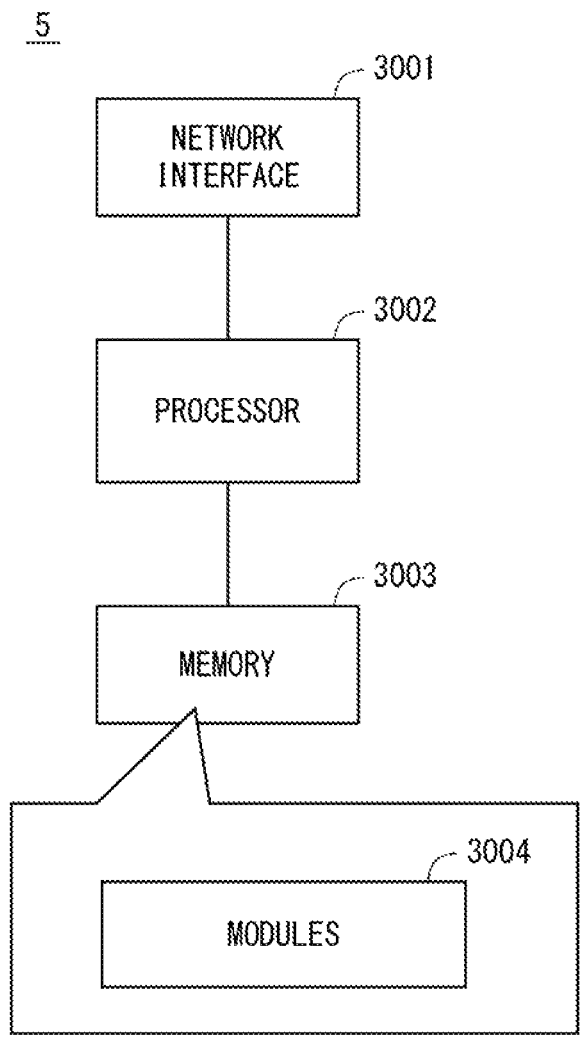
FIG. 30 is a block diagram showing a configuration example of a control node according to embodiments.

FIG. 30 is a block diagram showing a configuration example of the AMF/SMF entity 5 according to the above-described embodiments. Referring to FIG. 30, the AMF/SMF entity 5 includes a network interface 3001, a processor 3002, and a memory 3003. The network interface 3001 is used to communicate with network nodes (e.g., RAN nodes and other core network nodes). The network interface 3001 may include, for example, a network interface card (NIC) conforming to the IEEE 802.3 series.

The processor 3002 may be, for example, a microprocessor, an MPU, or a CPU. The processor 3002 may include a plurality of processors.

The memory 3003 is composed of a combination of a volatile memory and a nonvolatile memory. The volatile memory is, for example, an SRAM, a DRAM, or a combination thereof. The non-volatile memory is, for example, an MROM, a PROM, a flash memory, a hard disc drive, or any combination thereof. The memory 3003 may include a storage located apart from the processor 3002. In this case, the processor 3002 may access the memory 3003 via the network interface 3001 or an I/O interface (not shown).

The memory 3003 may store one or more software modules (computer programs) 3004 including instructions and data to perform the processing of the AMF/SMF entity 5 described in the above-described embodiments. In some implementations, the processor 3002 may be configured to load the one or more software modules 3004 from the memory 3003 and execute the loaded software modules, thereby performing the processing of the AMF/SMF entity 5 described in the above-described embodiments.

As described above with reference to FIGS. 28, 29, and 30, each of the processors included in the MN 1, the SN 2, the UE 3, and the AMF/SMF entity 5 according to the above-described embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

OTHER EMBODIMENTS

The above-described embodiments have mainly described as to the examples of the NR-NR DC. The configurations and operations of the apparatuses described in these embodiments may be used for the MR-DC with the 5GC.

The above-described embodiments have provided the examples in which the information elements (e.g., SCG-Config) and messages transmitted between the MN 1 and the SN 2 have the names and the configurations assuming the LTE DC. However, the names and the configurations of the information elements and message for the NR-NR DC may not be the same as those of the LTE DC. For example, at least some of the information elements included in the SCG-Config may be defined to be information elements of the Xn interface between the MN 1 and the SN 2. Furthermore, the names and structures of information elements may vary depending on the DC types (e.g., NR-NR DC, MR-DC with the 5GC (e.g., NG-EN-DC, NE-DC)). For example, in the NR-NR DC, both the MN and the SN use the NR RRC protocol, whereas in the MR-DC, the MN and the SN use different RRC protocols (i.e., the LTE RRC protocol and the NR RRC protocol). Accordingly, in the MR-DC, it may be preferable that both the MN and the SN know the association among a PDU session identifier, QoS flows included therein, and a DRB identity.

The above-described embodiments have described as to the examples of the Dual Connectivity. However, the above-described embodiments may be applied to Multi Connectivity (MC). For example, the above-described embodiments may be applied to a configuration in which three N3 tunnels (NG-U tunnels) are simultaneously supported for a single PDU session when two SNs (e.g., an SN 2-1 and an SN 2-2) are present with respect to a single MN in communication with a single UE. In other words, the single PDU session may be split over the MN 1, the SN 2-1, and the SN 2-2. Alternatively, the single PDU session may be split over the two SN 2-1 and SN 2-2, or split over the MN 1 and one of the two SNs (the SN 2-1 or the SN 2-2). In this way, the above-described embodiments can be expanded to a configuration in which a single PDU session is split over three or more RAN nodes (i.e., the MN and SNs) (i.e., a configuration in which three or more N3 tunnels (NG-U tunnels) corresponding to a single PDU session are configured) in the MC.

The above-described embodiments have assumed that the UE 3 supporting the NR-NR DC or MR-DC function also supports the PDU session split function. However, there may be UEs that support the NR-NR DC or MR-DC function but do not support the PDU session split function. For example, a terminal capability indicating the support for (the function of) the PDU session split (e.g., PDU session split support, or PDU-SessionTypeSplit) may be specified.

The terminal capability indicating the support for the PDU session split may be a UE AS Capability (e.g., a UE radio access capability) or a UE NAS Capability (e.g., UE network capability). When the terminal capability is the UE AS capability, the UE 3 may transmit an information element indicating the terminal capability to the MN 1 via an RRC message. In contrast, when the terminal capability is the UE NAS capability, the UE 3 may transmit an information element indicating the terminal capability to the AMF/SMF entity 5 via a NAS message.

Alternatively, when the terminal capability is the UE NAS capability, the AMF/SMF entity 5 may inform the MN 1 of the terminal capability. The AMF/SMF entity 5 may indicate the terminal capability to the MN 1 on a per-UE basis.

Alternatively, the AMF/SMF entity 5 may take into account whether or not the UE 3 has the terminal capability in order to determine whether or not to permit the PDU session split for a PDU session of the UE 3. For example, in a PDU session establishment procedure, the AMF/SMF entity 5 may receive an information element indicating the terminal capability from the UE 3 or from a subscriber information server (e.g., a Home Subscriber Server (HSS)).

The AMF/SMF entity 5 may then determine whether or not to permit the PDU session split for the PDU session of the UE 3 while taking the received information element into account. In other words, the AMF/SMF entity 5 may determine whether or not to permit the PDU session split on a per-UE basis based on the terminal capability of a UE.

This enables the MN 1 or the AMF/SMF entity 5 to properly determine one or more RAN nodes in which a PDU session for the UE 3 is to be established (mapped) while taking into account the capability of the UE 3 to support the PDU session split. Alternatively, this enables the AMF/SMF 5 to properly determine whether or not to permit the request from the MN 1 for the PDU session split.

The MN 1 and the SN 2 described in the above embodiments may be implemented based on a Cloud Radio Access Network (C-RAN) concept. The C-RAN is also referred to as a Centralized RAN. In this case, processes and operations performed by each of the MN 1 and the SN 2 described in the above-described embodiments may be provided by a Digital Unit (DU) included in the C-RAN architecture, or by a combination of the DU and a Radio Unit (RU). The DU is also referred to as a Baseband Unit (BBU) or a Central Unit (CU). The RU is also referred to as a Remote Radio Head (RRH), a Remote Radio Equipment (RRE), a Distributed Unit (DU), or a Transmission and Reception Point (TRP). That is, processes and operations performed by each of the MN 1 and the SN 2 described in the above-described embodiments may be provided by one or more radio stations (or RAN nodes).

Further, the above-described embodiments are merely examples of applications of the technical ideas obtained by the inventor. These technical ideas are not limited to the above described embodiments and various modifications may be made thereto.

REFERENCE SIGNS LIST

1 MASTER NODE (MN)
2 SECONDARY NODE (SN)
3 USER EQUIPMENT (UE)
4 CORE NETWORK
5 CONTROL PLANE (CP) NODE
6 USER PLANE (UP) NODE
7 RAN NODE
8 TARGET gNB
2801 RF TRANSCEIVER
2804 PROCESSOR
2805 MEMORY
2901 RF TRANSCEIVER
2903 BASEBAND PROCESSOR
2904 APPLICATION PROCESSOR
2906 MEMORY
3002 PROCESSOR
3003 MEMORY

The invention claimed is:

1. A master Radio Access Network (RAN) node comprising:
    a memory; and
    at least one processor coupled to the memory and configured to:
        receive a PDU session resource setup request message from an Access and Mobility Management Function (AMF) in a core network, during a procedure of establishing a PDU session between a radio terminal and a User Plane Function (UPF) in the core network, wherein the PDU session resource setup request message includes first information indicating either split of the PDU session is permitted or split of the PDU session can be performed; and
        send, to the AMF after the PDU session has been established, a PDU Session Resource Modify Indication message requesting modification of the PDU session, wherein
    the PDU Session Resource Modify Indication message is used to indicate to the AMF that the already established PDU session is to be split over a plurality of tunnels, and
    the PDU Session Resource Modify Indication message includes a list of one or more Quality of Service (QoS) flows associated with the split of the already established PDU session.

2. The master RAN node according to claim 1, wherein the first information indicates, on a per-network slice basis, whether or not the split of the PDU session is permitted or whether or not the split of the PDU session can be performed.

3. The master RAN node according to claim 1, wherein the split of the PDU session includes moving one or more QoS flows of a plurality of QoS flows associated with the already established PDU session from a first tunnel between the UPF and the master RAN node to a second tunnel between the UPF and a secondary RAN node, or from the second tunnel to the first tunnel.

4. The master RAN node according to claim 1, wherein the at least one processor is configured to send an inter-node message to a secondary RAN node, wherein the inter-node message is used to indicate to the secondary RAN node that the already established PDU session is to be split over the plurality of tunnels, and the inter-node message includes a list of the one or more QoS flows associated with the split of the already established PDU session.

5. The master RAN node according to claim 4, wherein the inter-node message includes PDU-session-establishment type information explicitly indicating that PDU session split is to be applied to the PDU session or to the one or more QoS flows.

6. The master RAN node according to claim 1, wherein the at least one processor is configured to transmit, to the radio terminal, a Radio Resource Control (RRC) connection reconfiguration message indicating a secondary cell group configuration for dual connectivity, wherein the RRC connection reconfiguration message is used to indicate to the radio terminal that the already established PDU session is to be split over the plurality of tunnels, and the RRC connection reconfiguration message includes a list of the one or more QoS flows associated with the split of the already established PDU session.

7. The master RAN node according to claim 6, wherein the secondary cell group configuration includes an identifier of the first PDU session and identifiers of one or more data radio bearers to be associated with the one or more QoS flows, in order to implicitly or explicitly indicate the split of the PDU session.

8. The master RAN node according to claim 6, wherein the secondary cell group configuration includes data-radio-bearer type information explicitly indicating that PDU session split is to be applied to the PDU session or to the one or more QoS flows.

9. The master RAN node according to claim 1, wherein the at least one processor is configured to send a handover request message to a target RAN node to request a handover of the radio terminal from the master RAN node to the target RAN node, and the handover request message indicates that PDU session split has been applied to the PDU session or to the one or more QoS flows.

10. The master RAN node according to claim 9, wherein the handover request message includes PDU-session type information or QoS-flow type information explicitly indicating that the PDU session split has been applied to the PDU session or to the one or more QoS flows.

11. The master RAN node according to claim 10, wherein
the handover request message includes terminal context reference information for distinguishing the radio terminal at the secondary RAN node, and
the terminal context reference information includes an indication indicating that the PDU session split has been applied to the PDU session or to the one or more QoS flows.

12. An Access and Mobility Management Function (AMF) node to be located in a core network, the AMF node comprising:
a memory; and
at least one processor coupled to the memory and configured to:
send a PDU session resource setup request message to a master Radio Access Network (RAN) node, during a procedure of establishing a PDU session, wherein the PDU session resource setup request message includes first information indicating either split of the PDU session is permitted or split of the PDU session can be performed; and
receive, from the master RAN node after the PDU session has been established, a PDU Session Resource Modify Indi cation message requesting modification of the PDU session, wherein
the PDU Session Resource Modify Indication message is used to indicate to the AMF node that the already established PDU session is to be split over a plurality of tunnels, and
the PDU Session Resource Modify Indication message includes a list of one or more Quality of Service (QoS) flows associated with the split of the already established PDU session.

13. The AMF node according to claim 12, wherein the first information indicates, on a per-network slice basis, whether or not the split of the PDU session is permitted or whether or not the split of the PDU session can be performed.

14. The AMF node according to claim 12, wherein the split of the PDU session includes moving one or more QoS flows of a plurality of QoS flows associated with the already established PDU session from a first tunnel between a User Plane Function (UPF) and the master RAN node to a second tunnel between the UPF and a secondary RAN node, or from the second tunnel to the first tunnel.

15. A method performed by a master Radio Access Network (RAN) node, the method comprising:
receiving a PDU session resource setup request message from an Access and Mobility Management Function (AMF) in a core network, during a procedure of establishing a PDU session between a radio terminal and a User Plane Function (UPF) in the core network, wherein the PDU session resource setup request message includes first information indicating either split of the PDU session is permitted or split of the PDU session can be performed; and
sending, to the AMF after the PDU session has been established, a PDU Session Resource Modify Indication message requesting modification of the PDU session, wherein
the PDU Session Resource Modify Indication message is used to indicate to the AMF that the already established PDU session is to be split over a plurality of tunnels, and
the PDU Session Resource Modify Indication message includes a list of one or more Quality of Service (QoS) flows associated with the split of the already established PDU session.

* * * * *